(12) United States Patent
Fecko

(10) Patent No.: US 10,184,547 B2
(45) Date of Patent: Jan. 22, 2019

(54) CYCLOID GEAR

(71) Applicant: SPINEA S.R.O., Presov (SK)

(72) Inventor: Tibor Fecko, Presov (SK)

(73) Assignee: SPINEA S.R.O., Presov (SK)

( * ) Notice: Subject to any disclaimer, the term of this patent is extended or adjusted under 35 U.S.C. 154(b) by 295 days.

(21) Appl. No.: 14/779,892

(22) PCT Filed: Mar. 21, 2014

(86) PCT No.: PCT/EP2014/000777
§ 371 (c)(1),
(2) Date: Sep. 24, 2015

(87) PCT Pub. No.: WO2014/154340
PCT Pub. Date: Oct. 2, 2014

(65) Prior Publication Data
US 2016/0053871 A1 Feb. 25, 2016

(30) Foreign Application Priority Data

Mar. 25, 2013 (EP) .................................... 13001506

(51) Int. Cl.
*F16H 3/70* (2006.01)
*F16H 1/32* (2006.01)

(52) U.S. Cl.
CPC ................. *F16H 3/70* (2013.01); *F16H 1/32* (2013.01); *F16H 2001/323* (2013.01);
(Continued)

(58) Field of Classification Search
CPC ......... F16H 2001/324; F16H 2001/325; F16H 2001/326; F16H 2001/323; F16H 3/70; F16H 1/32
See application file for complete search history.

(56) References Cited

U.S. PATENT DOCUMENTS 2,475,504 A * 7/1949 Jackson .................... F16H 1/32
475/179
5,505,668 A * 4/1996 Koriakov-Savoysky ....................
F16H 1/32
475/180
(Continued)

FOREIGN PATENT DOCUMENTS

TW 2001111666 A 4/2011
WO 95/22017 A1 8/1995
(Continued)

*Primary Examiner* — Stacey A Fluhart
(74) *Attorney, Agent, or Firm* — Steven M. Shape; Dennemeyer & Associates

(57) ABSTRACT

A housing (02) with a cylindrical inner housing wall (21) that is disposed concentrically about a cylinder axis (20) and is provided with an inner set of teeth (22). It further includes an input shaft (03), supported rotatably about the cylinder axis (20), having at least two eccentric portions (31) of identical eccentricity (32) that are disposed rotationally about the longitudinal axis (30) of the input shaft (03). Moreover, it includes an output shaft (04), supported rotatably about the cylinder axis (20), and the longitudinal axes (30, 40) of the input shaft (03) and output shaft (04) coincide with the cylinder axis (20). Furthermore, it includes at least two cycloid disks (05, 06, 07), of which each cycloid disk (05, 06, 07) is disposed rotatably about its own central rotary axis (50, 60, 70) on an eccentric portion (31) and has an outer set of teeth (51, 61, 71), meshing with the inner set of teeth (22)/ The rotary axis (50, 60, 70) of each cycloid disk (05, 06, 07) is offset by the eccentricity (32) to the cylinder axis (20), and the diameter of the cycloid disks (05, 06, 07) is dimensioned such that their outer set of teeth (51, 61, 71) in one direction comes to mesh with the inner set of teeth (22), in which direction the eccentric portion (31), on which a cycloid disk (05, 06, 07) is disposed, is pointing at the moment. Conversely, in the opposite direction, the outer set
(Continued)

Figure 1:
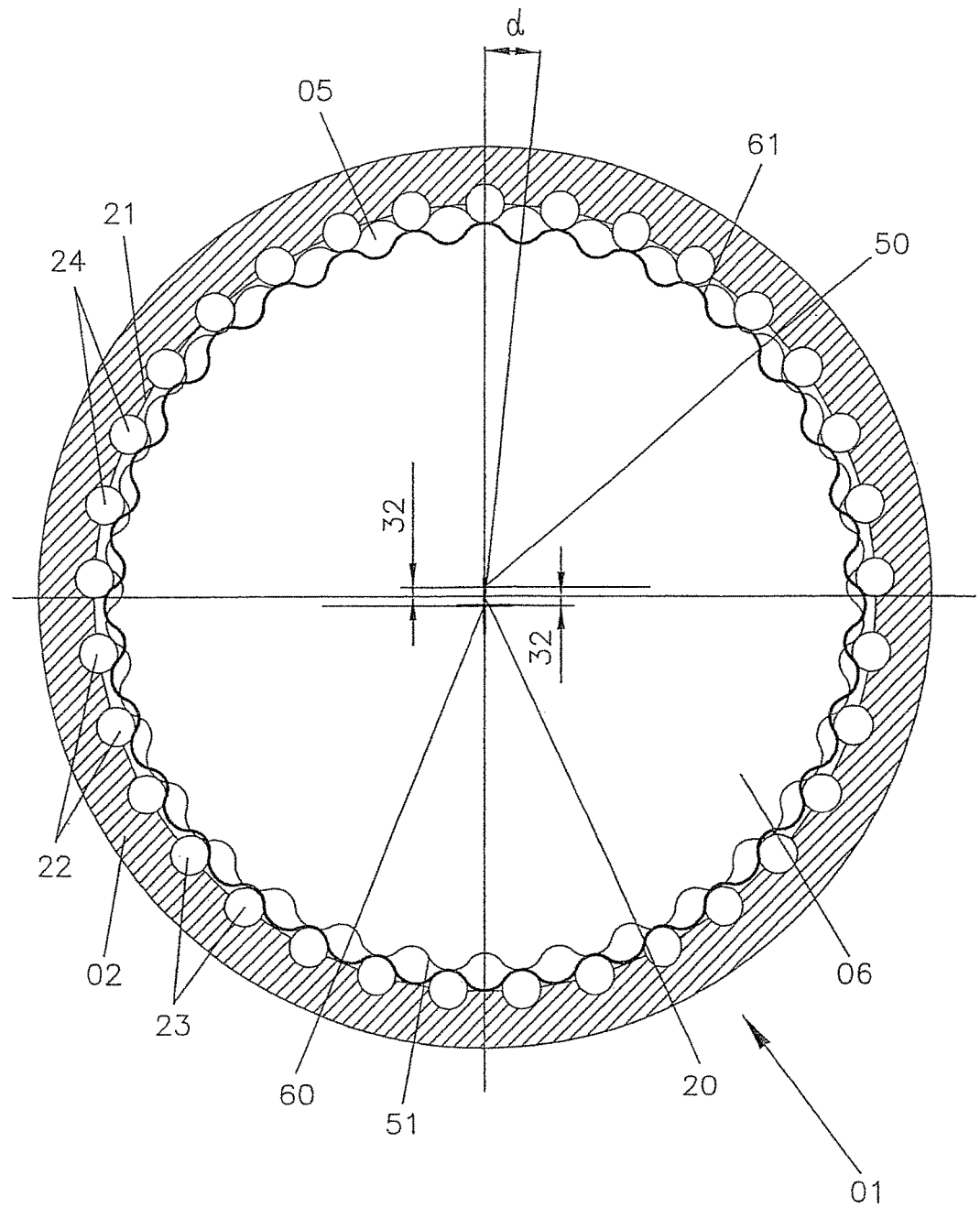

of teeth (51, 61, 71) is free of an engagement with the inner set of teeth (22), and the cycloid disks (05, 06, 07) each have reference faces (53, 63). Additionally, it includes at least one output device (08), supported rotatably about the cylinder axis (20), which output device is operatively connected to at least one cycloid disk (05, 06, 07) such that the motions of one or more cycloid disks (05, 06, 07), as they roll in the housing (02), are converted into a rotary motion of the output shaft (04). The cycloid gear (01) is distinguished by an even-numbered gear ratio i. The outer sets of teeth (51, 61, 71) of the cycloid disks (05, 06, 07) each have an even number of teeth. The inner set of teeth (22) of the housing (02) has a number of teeth N+Z or N−Z that is higher or lower than a (whole) number Z.

17 Claims, 14 Drawing Sheets

(52) U.S. Cl.
CPC .. *F16H 2001/324* (2013.01); *F16H 2001/325* (2013.01); *F16H 2001/326* (2013.01)

(56) References Cited

U.S. PATENT DOCUMENTS

| | | | |
|---|---|---|---|
| 2004/0192486 A1* | 9/2004 | Tsurumi | F16H 1/32 475/168 |
| 2010/0199796 A1* | 8/2010 | Nakamura | B25J 9/102 74/490.03 |
| 2011/0207576 A1* | 8/2011 | Wang | F16H 1/32 475/331 |
| 2011/0275469 A1* | 11/2011 | Miyoshi | F16H 1/32 475/162 |
| 2012/0329596 A1* | 12/2012 | Nomura | F16H 1/32 475/149 |

FOREIGN PATENT DOCUMENTS

| | | |
|---|---|---|
| WO | 2008/052691 A1 | 5/2008 |
| WO | 2009/103557 A1 | 8/2009 |

* cited by examiner

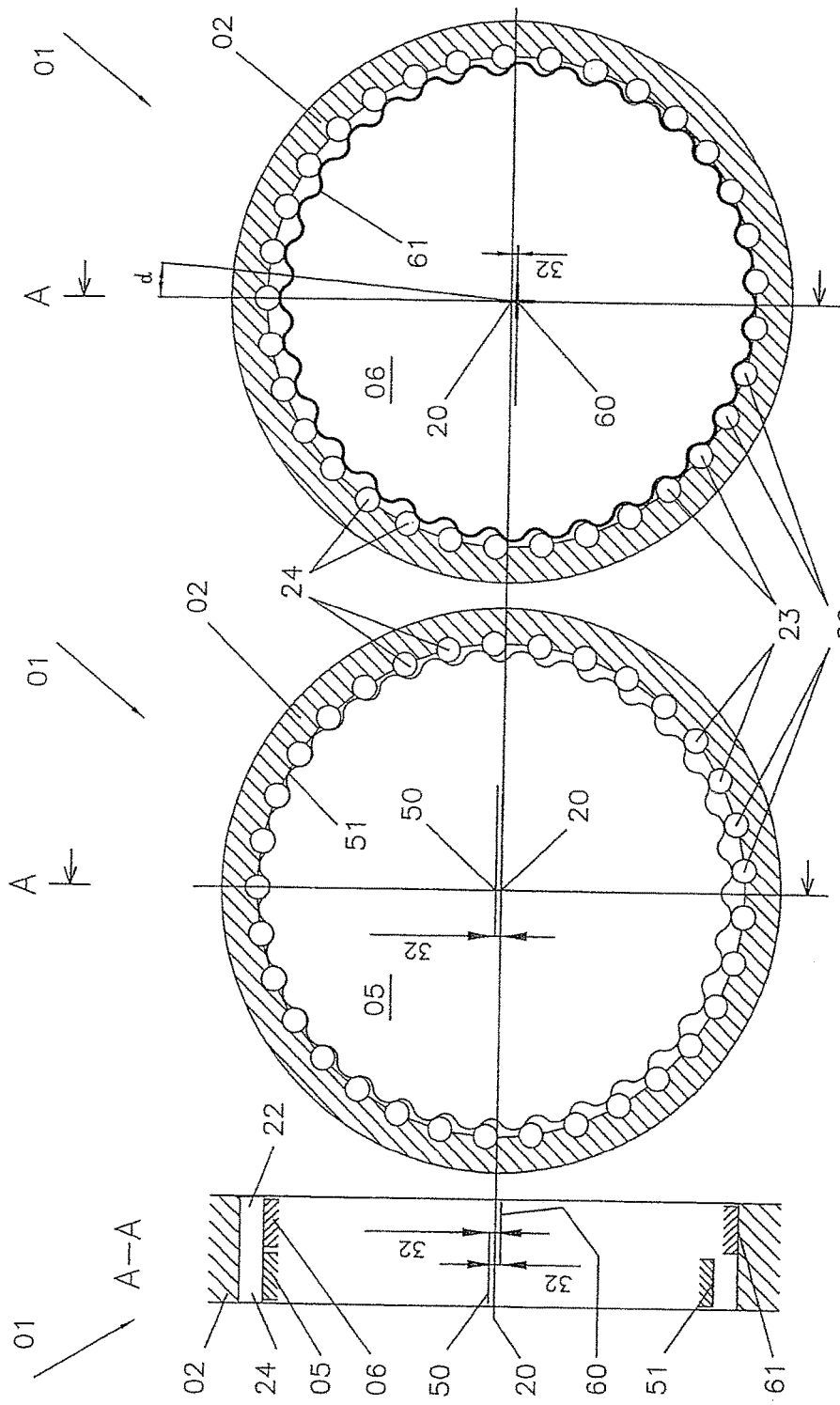

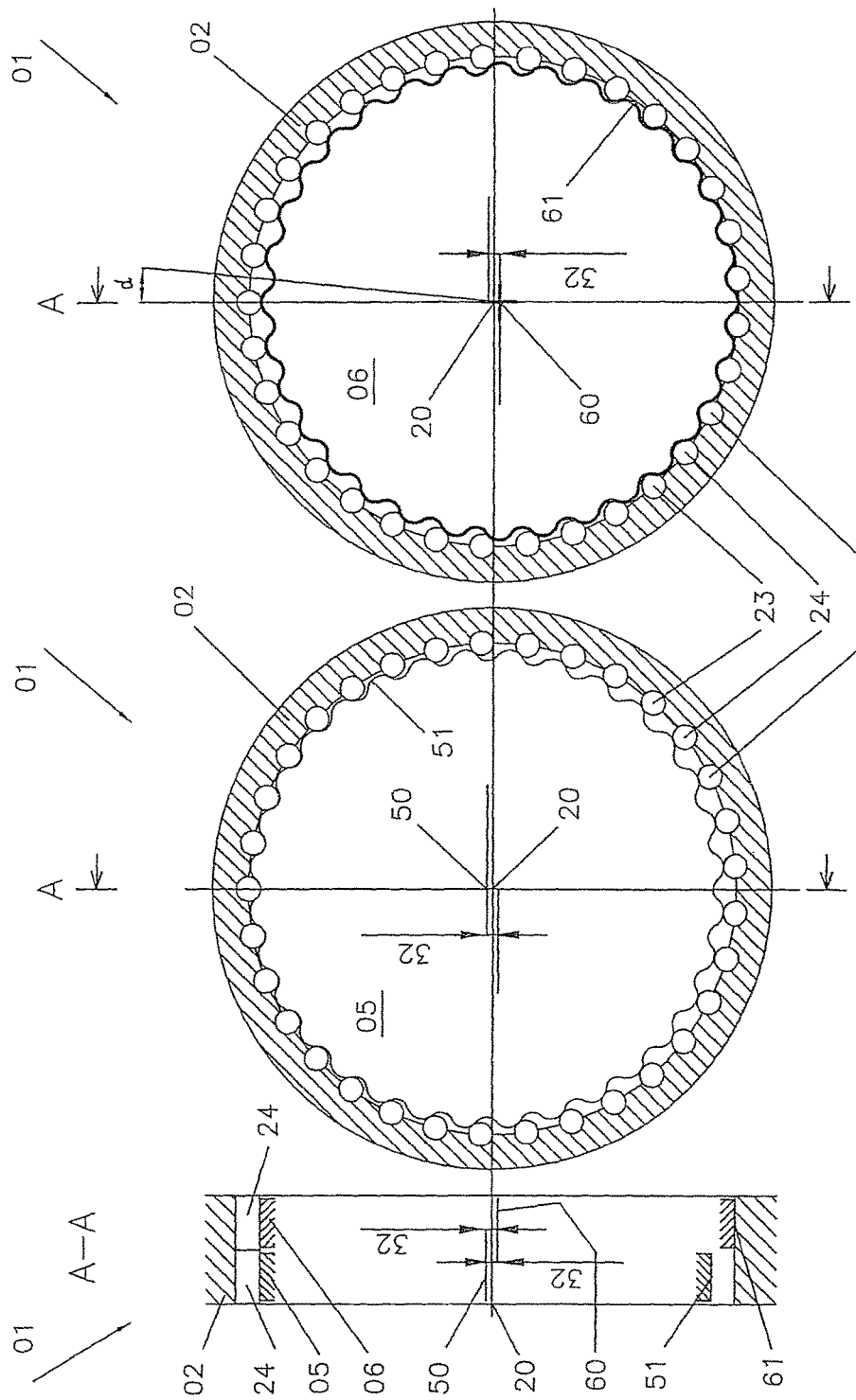
Fig 6.1
Fig 6.2
Fig 6.3

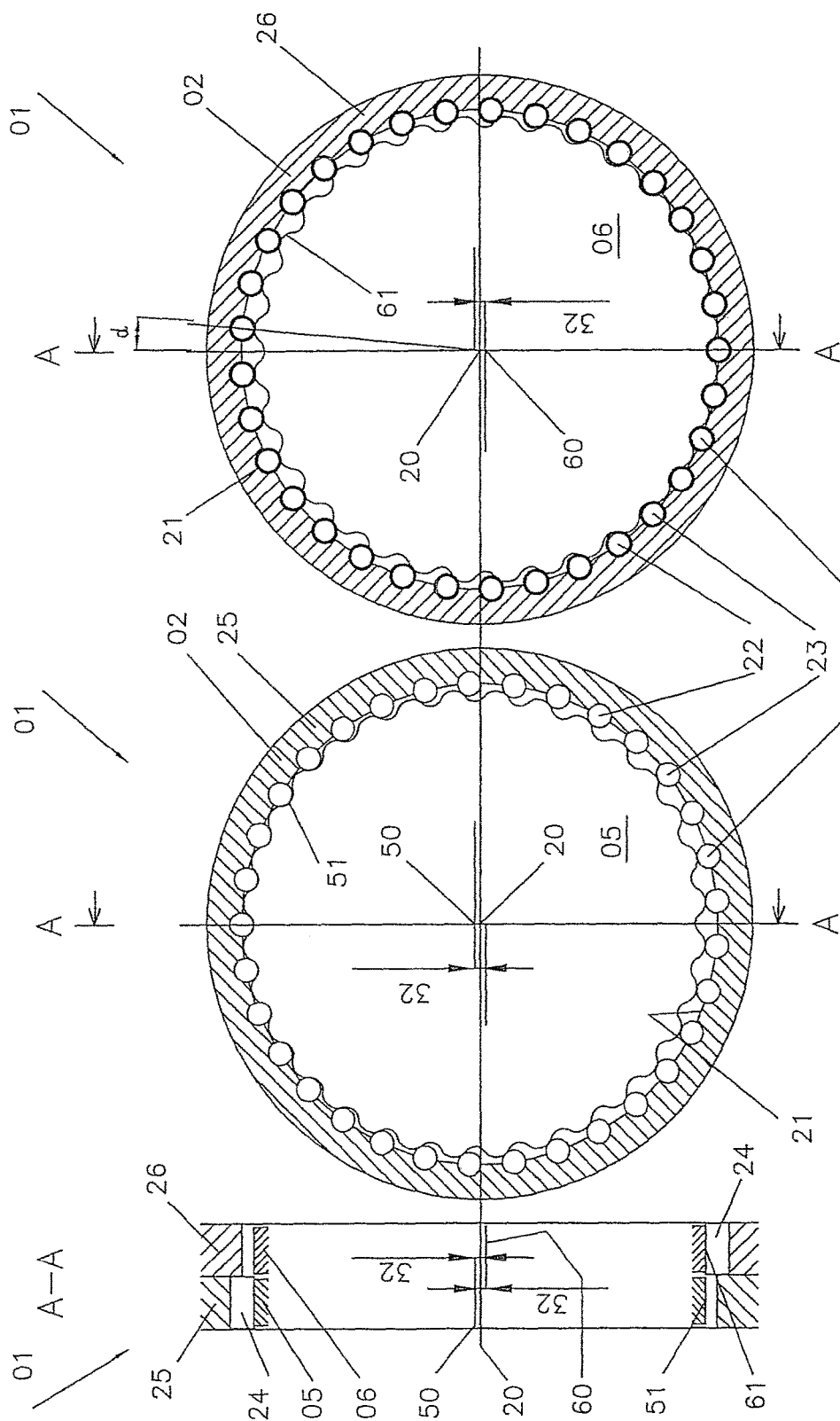

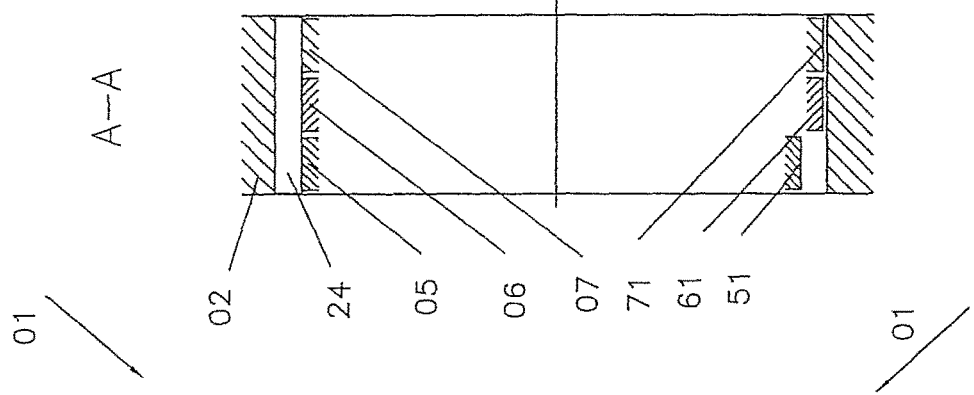
Fig 8.1
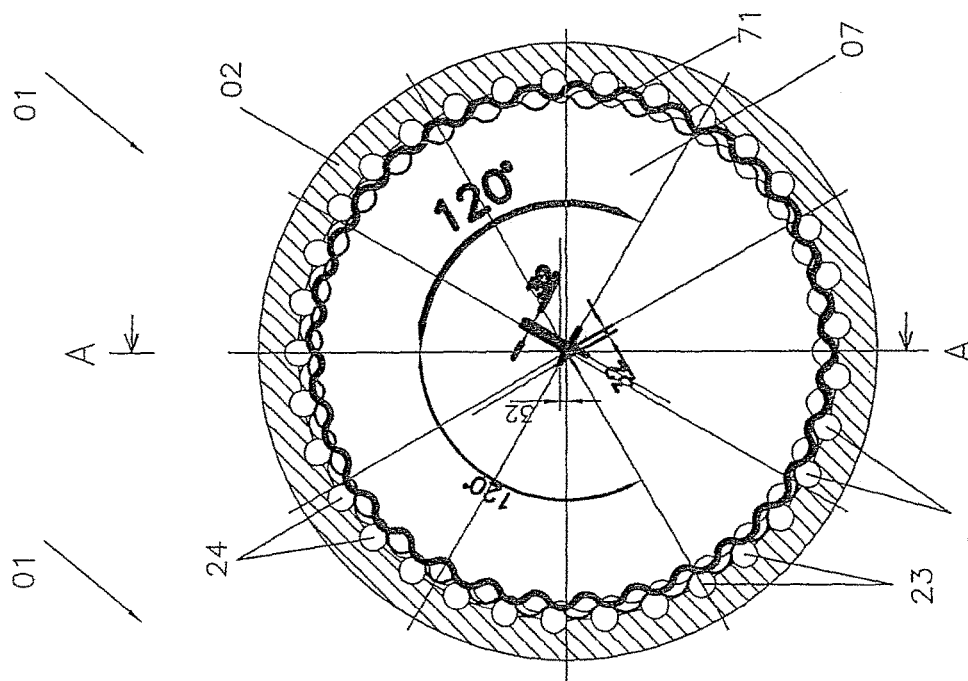
Fig 8.2
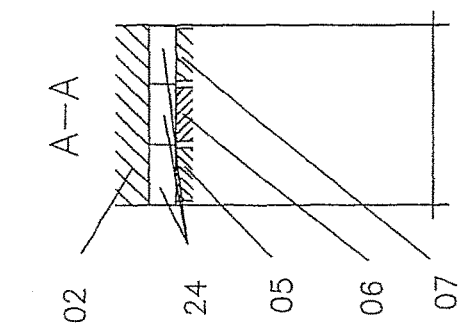
Fig 8.3
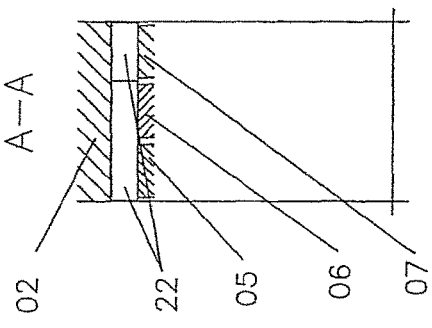
Fig 8.4

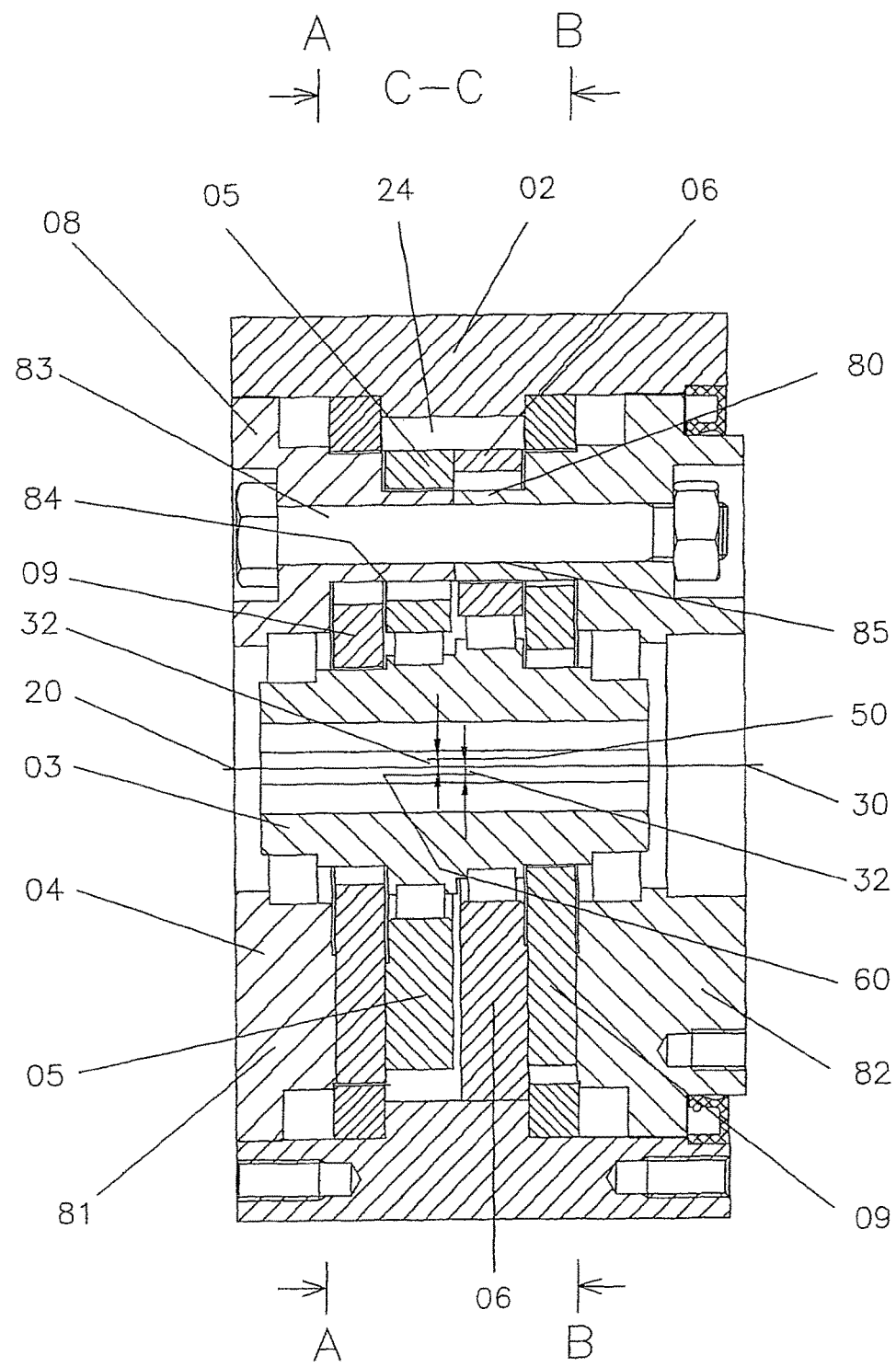
Fig 9.1

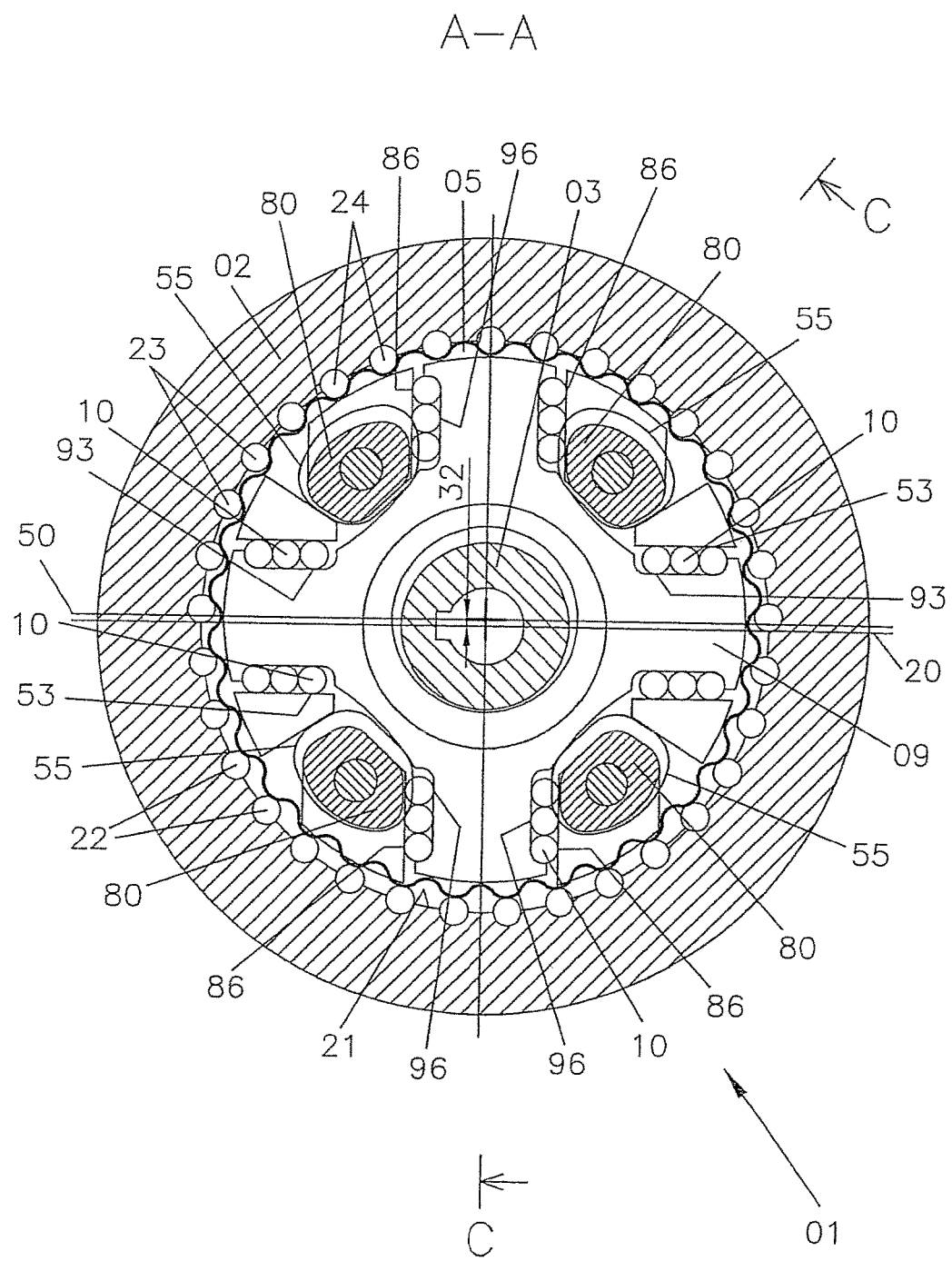
Fig 9.2

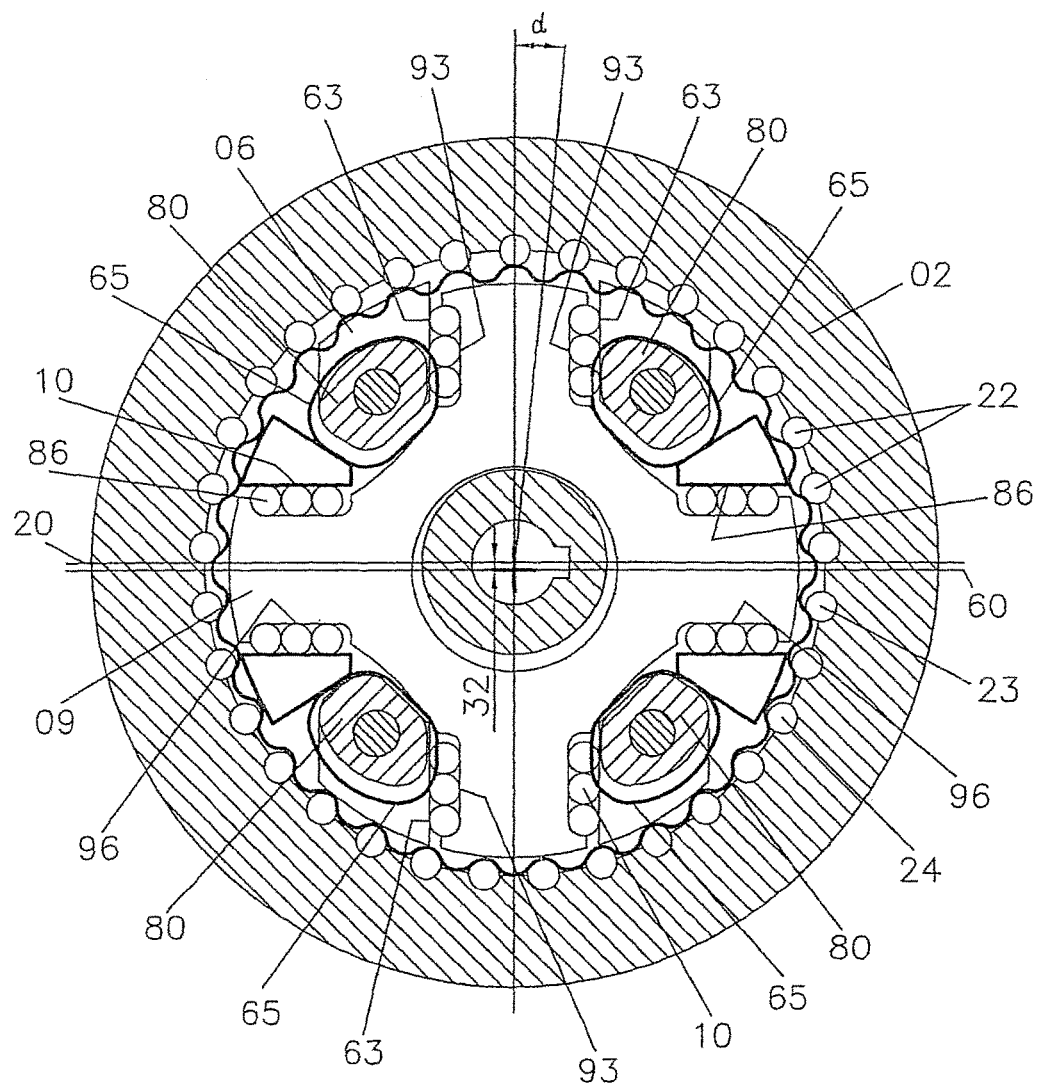
Fig 9.3

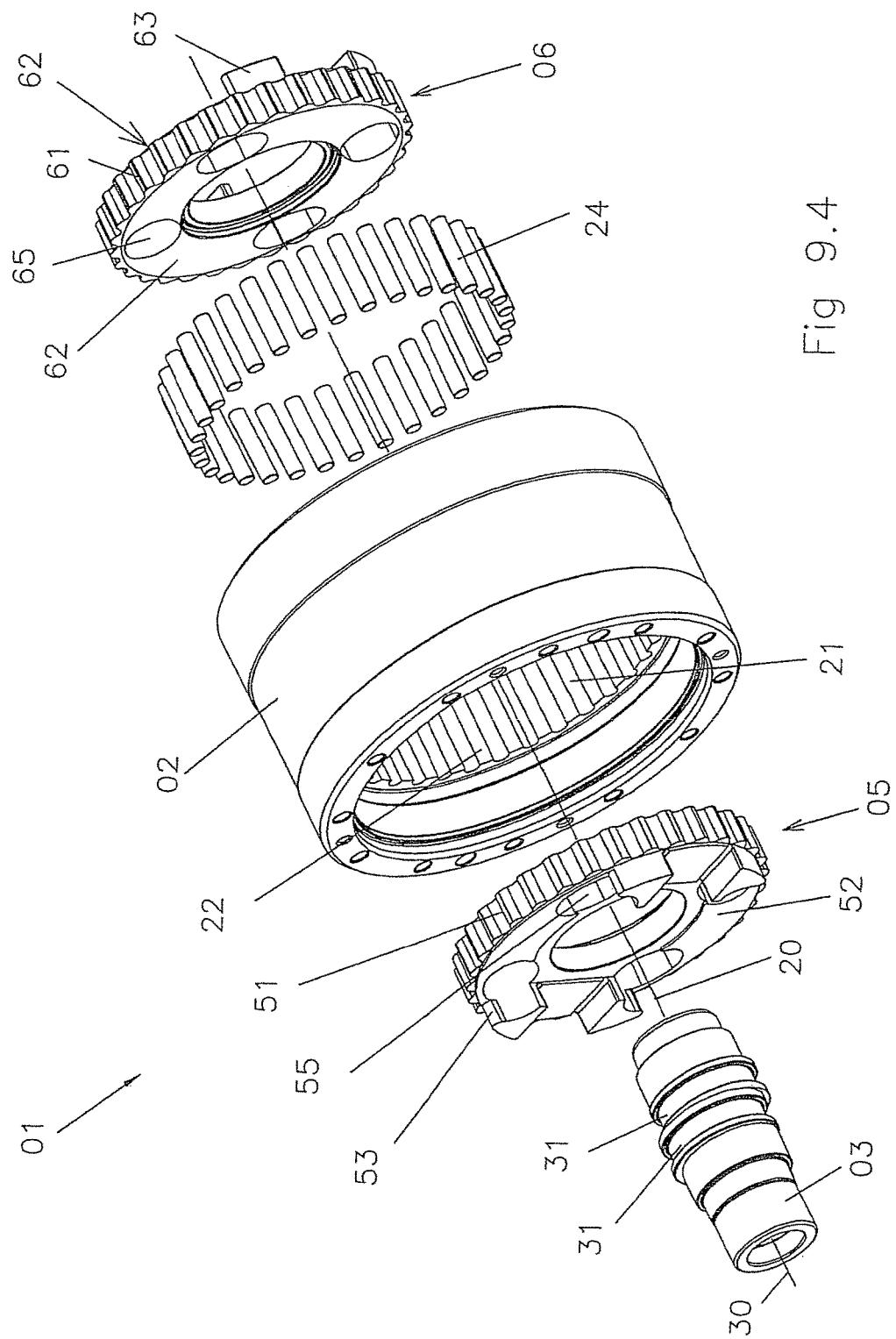
Fig 9.4

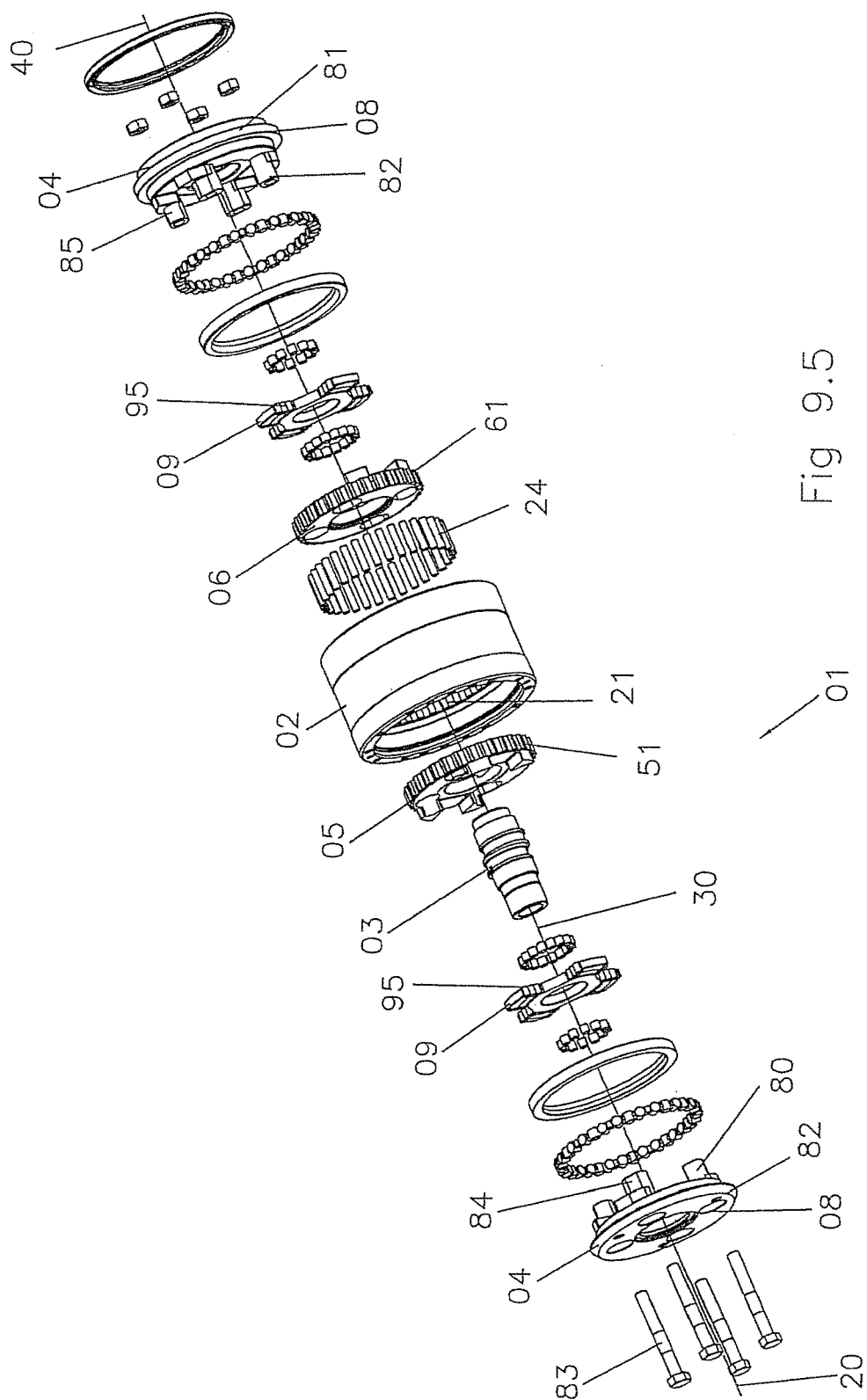
Fig 9.5

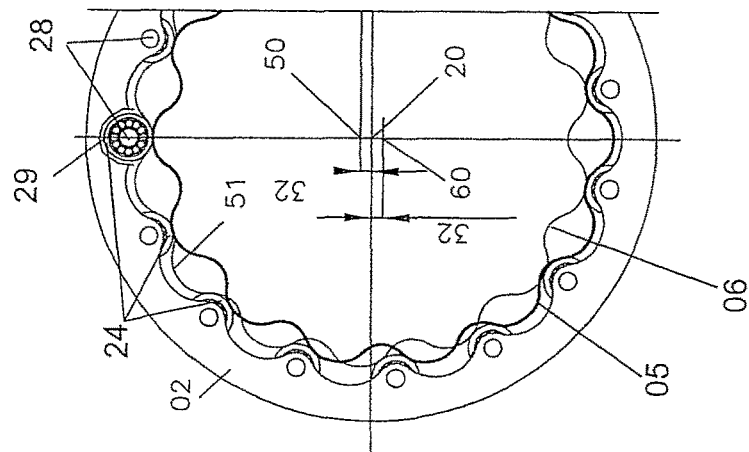
Fig. 10.3
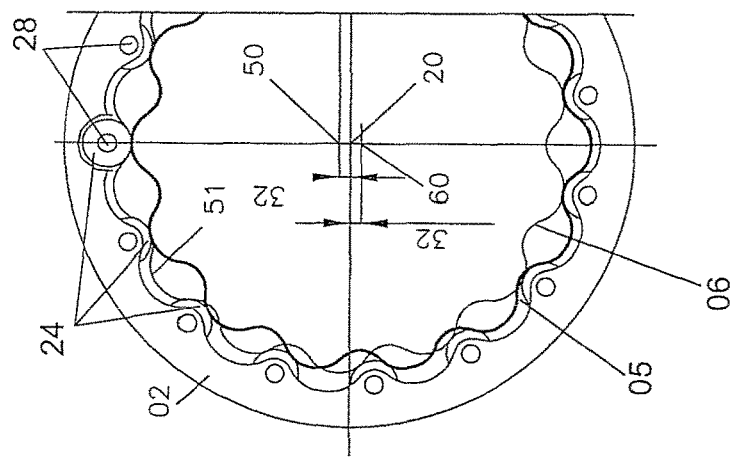
Fig. 10.2
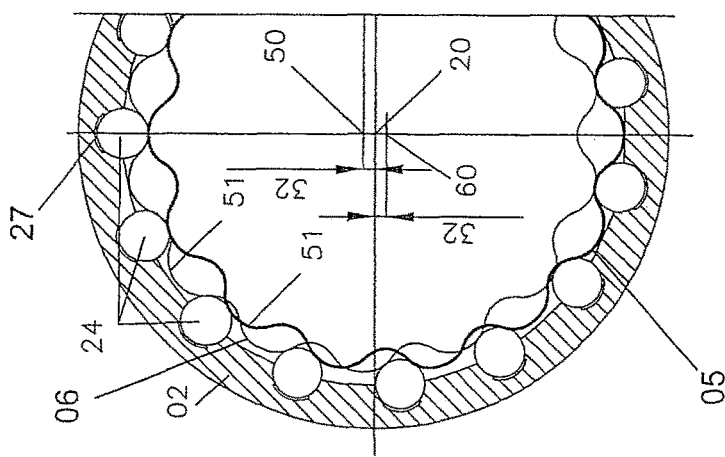
Fig. 10.1

CYCLOID GEAR

The invention relates to a single-stage cycloid gear as defined by the preamble to claim 1.

A single-stage cycloid gear includes one or more eccentrically driven cycloid disks, each offset from one another by means of an input shaft provided with a corresponding number of eccentrics disposed rotationally uniformly relative to one another, and the cycloid disks roll in a housing. A cycloid disk can for instance be embodied as a gear wheel with an outer set of teeth, or as a cam disk. The contact between the housing and a cycloid disk can be established for instance by means of an inner set of teeth, also with teeth or via roller and/or ball bearings. An output device converts the motions of the one or more cycloid disks, as they roll in the housing, into a rotary motion of an output shaft. For this purpose, the output device can be connected to the output shaft or surround it or be surrounded by it. The output device, for converting the motions of the at least one cycloid disk, is operatively connected to one or more reference faces of the at least one cycloid disk, for instance guideways and/or protrusions and/or grooves and/or eccentric through openings, all disposed on a cycloid disk, to name only some conceivable embodiments. Roller bearings and/or rolling elements can be provided between the output device and the reference faces.

The input and output shafts can be transposed, since cycloid gears do not have a self-locking effect.

For the sake of simplicity, hereinafter the term "tooth" will be used to represent all conceivable embodiments of the contact between the cycloid disk and the housing.

An eccentric of a cycloid gear drives a cycloid disk having n teeth, which rolls in a stationary housing having n+1 teeth. The cycloid disk rolls over the teeth of the housing in the process. Each revolution of the input shaft and thus of the eccentric moves the cycloid disk, and with it the output shaft, onward by one tooth. Thus lower rotary speeds occur counter to the direction of rotation of the input shaft. The gear ratio i, for which $i=n/((n+1)-n)$, corresponds to the number n of the teeth of the cycloid disk. The gear ratio i represents the following ratio: number of revolutions of the input shaft to the number of revolutions of the output shaft.

To achieve a high power density, along with an always uniform distribution of mass, it is known for cycloid gears to be embodied with two or more eccentrics, always distributed uniformly about the input shaft, and with a number of cycloid disks corresponding to the number of eccentrics. As a result, even high rotary speeds and high force transmissions, and correspondingly high power levels, can be mastered.

To enable an always uniform distribution of mass over one full passage of a cycloid gear corresponding to a full revolution of the output shaft by means of an arrangement of two or more cycloid disks distributed uniformly about the input shaft, an even number of teeth in the stationary housing is necessary.

Single-stage cycloid gears with two or more cycloid disks distributed uniformly about the input shaft thus have an odd-numbered gear ratio. This increases the complexity of controlling a drive mechanism of a single-stage cycloid gear with two or more cycloid disks distributed uniformly about the input shaft and also the complexity of calculating the presetting of the rotation of the output shaft, and this also involves less precision of controlling calculation in comparison to an even-numbered gear ratio.

As a result, cycloid gears can be used to a limited extent in conjunction for instance with actuating drives, in which to obtain an unambiguous ratio between input revolutions and output revolutions of a gear, an even-numbered gear ratio is preferred.

In such a single-stage cycloid gear with two or more cycloid disks disposed rotationally uniformly about the input shaft, the production and monitoring of the adherence to a predetermined geometry of the teeth in a housing, which are formed for instance preferably by rolling elements, such as rotatable bolts, and grooves in between them, can be done especially simply, because the teeth are each opposite one another by 180°. Moreover, all the reference faces of the cycloid disks have the same orientation, the same spacing, and the same rotary position relative to the teeth on the circumference of the cycloid disks. As a result, the cycloid disks, to attain high precision, are produced as a unit in a group.

To obtain an even-numbered step-up gear, it is known to combine a single-stage cycloid gear with one further gear to make a two- or multiple-stage gear with an even-numbered gear ratio. For instance, it is known to precede a single-stage cycloid gear with a spur gear, or to integrate a single-stage spur gear into a single-stage cycloid gear. As a result, an even-numbered gear ratio is the product of the odd-numbered gear ratio of the single-stage cycloid gear and of the gear disposed upstream of it, for instance.

It can be seen that combining a single-stage cycloid gear with a further gear to obtain an even-numbered gear ratio leads to considerable restrictions in terms of structural space needed, the effort and expense of production, and the complexity of the construction of the assembled gear.

From German Patent Disclosure DE 612 777, a single-stage cycloid gear with two or more cycloid disks, disposed rotationally uniformly about the input shaft and embodied identically, is known.

From European Patent Disclosure EP 1 046 456 A1, a hydraulic motor is known, which is embodied in a manner corresponding to a single-stage cycloid gear with a cycloid disk. The cycloid disk then has an even number of teeth on its outer circumference and a housing has an odd number of teeth, greater by one, on its inside circumference.

The object of the invention is to develop a single-stage cycloid gear with two or more cycloid disks disposed rotationally uniformly about the input shaft, which can be used without restrictions, for instance in combination with actuating drives.

This object is attained by the features of the independent claim.

Accordingly, the invention relates to a cycloid gear. The cycloid gear has a housing. The housing has a cylindrical inner housing wall disposed concentrically about a cylinder axis. The inner housing wall is provided with an inner set of teeth, whose teeth extend parallel to or obliquely to the cylinder axis. In or on the housing, an input shaft is supported rotatably. The input shaft has two or more eccentric portions, rotated singly or in groups, for instance in pairs, uniformly about the longitudinal axis of the input shaft. For instance, two eccentric portions, in their rotary position about the longitudinal axis of the input shaft, are rotated or distributed uniformly about the longitudinal axis of the input shaft if they are offset from one another in their rotary position by 180° about the longitudinal axis of the input shaft. Three eccentric portions are rotated or distributed uniformly about the longitudinal axis of the input shaft if they are offset from one another by 120° each about the longitudinal axis of the input shaft; if there are four eccentric portions, they are offset by 90°, etc. If a plurality of eccentric portions, for instance four, six, eight or groups of them, for instance in pairs, are provided, disposed rotationally uniformly about the longitudinal axis of the input shaft, then the eccentric portions combined into one group have the same rotary position; for a paired grouping, accordingly each two eccentric portions have the same rotary position. Compared to that rotary position, the remaining groups of eccentric portions are offset uniformly from one another about the longitudinal axis of the input shaft.

All the eccentric portions have the same eccentricity.

An output shaft is supported rotatably in or on the housing. The longitudinal axes of the input shaft and of the output shaft coincide with the cylinder axis.

The cycloid gear furthermore has at least two cycloid disks. Each cycloid disk is disposed rotatably about its own central rotary axis on an eccentric portion. The rotary axis of each cycloid disk is offset from the cylinder axis by the eccentricity of the eccentric portions. The same number of cycloid disks is disposed rotatably on each eccentric portion of the input shaft. Preferably, one cycloid disk is disposed rotatably on each eccentric portion.

The cycloid disks each have an outer set of teeth that meshes with the inner set of teeth of the cylindrical inner housing wall. The diameter of the cycloid disks is dimensioned such that their outer set of teeth in one direction comes in meshing fashion into engagement with the inner set of teeth of the cylindrical inner housing wall, in which direction the eccentric on which a cycloid disk is disposed points at the moment. Conversely, in the opposite direction, the outer set of teeth is free from any engagement with the inner set of teeth of the cylindrical inner housing wall. As a result, the cycloid disks can roll on the inner housing wall.

The cycloid disks, on or in at least one face end extending perpendicular to the rotary axis, each have reference faces. These reference faces serve the purpose of torque transmission from the cycloid disks to at least one output device, supported rotatably about the cylinder axis on or in the housing, by converting the motions of the cycloid disks as they roll in the housing into a rotary motion of the output shaft. Each reference face can include one or more face portions located in one or more planes extending parallel to the cylinder axis. For the reference faces, it then is generally true that they extend parallel to the cylinder axis and thus also parallel to the rotary axis of the cycloid disks. A straight line including the cylinder axis extends parallel to a face, if it is located entirely in a plane that either includes the face or does not intersect it. As a result, the reference faces can alternatively or in addition to flat faces also include cylindrical outer faces of protrusions, protruding from the cycloid disks parallel to the cylinder axis, such as pegs and/or cylindrical inner surfaces of recesses, extending parallel to the cylinder axis, in the cycloid disks, such as the inner surfaces for instance of eccentric through openings and/or blind bores provided in the cycloid disks.

Because of the support of the cycloid disks on the eccentric portions, the cycloid disks as they roll in the housing execute back and forth relative motions orthogonally with respect to the output shaft. The reference faces permit these back and forth motions relative to a rotary motion of the output shaft, with simultaneous torque transmission. One or more reference faces may for instance include guideways and/or protrusions and/or grooves extending radially perpendicular to the rotary axis, and/or eccentrically disposed pins and/or bolts extending parallel to the rotary axis, and/or eccentric through openings connecting the two face ends of one cycloid disk to one another, in other to name only a few conceivable embodiments.

Thus the cycloid gear moreover has at least one output device, already mentioned, that is supported on or in the housing rotatably about the cylinder axis. The output device may be formed of two revolute bodies, connected to one another by means of spacer bodies. The spacer bodies can extend through through openings in the cycloid disks, so that the cycloid disks of the cycloid gear are disposed between the revolute bodies of the output device.

The at least one output device is operatively connected to one or more reference faces of at least one cycloid disk in such a way that the motions of at least the respective cycloid disk are converted into rotary motions of the output shaft. In the process, the motions of one or more cycloid disks as they roll in the housing are converted into a rotary motion of the output shaft. For this purpose, at least one output device can be connected to or surround or be surrounded by the output shaft.

To that end, the at least one output device can likewise have one or more reference faces corresponding to the reference faces of the cycloid disks. One or more reference faces of the output device may have radially extending guideways and/or protrusions and/or grooves extending perpendicular to the cylinder axis and disposed in or on a face extending perpendicularly to the cylinder axis, and/or may include eccentric through openings and/or eccentrically disposed pins and/or bolts extending parallel to the rotary axis, to name only a few conceivable embodiments. As a result, corresponding pairs of reference faces result between at least one cycloid disk and at least one output device, which permit translational relative motions in directions perpendicular to the cylinder axis between the cycloid disk and the output device and prevent rotational relative motions about the cylinder axis between the cycloid disk and the output device. Roller bearings and/or rolling elements can be provided between the reference faces of the output device that form pairs and the reference faces of the cycloid disk. As a result, friction losses are reduced, and the efficiency of the cycloid gear is increased.

Alternatively, an output device can be provided for a group of two or more cycloid disks that are distributed uniformly about the cylinder axis. Between each cycloid disk and the output device there is one transformation device. The output device, like the cycloid disks, has one or more reference faces. One or more reference faces of the output device can include radially extending guideways and/or protrusions and/or grooves extending perpendicular to the cylinder axis and disposed in or on a face extending perpendicular to the cylinder axis, and/or eccentric through openings and/or eccentrically disposed pins and/or bolts extending parallel to the rotary axis, to name only some conceivable embodiments. However, here the reference faces of the cycloid disks do not correspond to those of the output device. Instead, each transformation device has reference faces, corresponding to the reference faces of the respective cycloid disk, and also has reference faces corresponding to the reference faces of the output device. The result is corresponding pairs of reference faces between each cycloid disk and the transformation device associated with it, as well as corresponding pairs of reference faces between the transformation device and the output device. The pairs of reference faces permit translational relative motions in directions perpendicular to the cylinder axis between the cycloid disk and the output device and prevent rotational relative motions about the cylinder axis between the cycloid disk and the output device. Here the transformation devices execute, intermediate motions. These are, referred to the respective transformation device, first back and forth intermediate motions in a first direction relative to the output device and second back and forth intermediate motions in a second direction, orthogonal to the first direction, relative to the cycloid disk. The two first and second directions perpendicular to one another are located in a plane extending perpendicular to the cylinder axis. Roller bearings and/or rolling elements can be provided between the reference faces of the og that form pairs and the reference faces of the transformation devices as well as between the reference faces that form pairs of the transformation devices and the cycloid disks. As a result, friction losses are reduced and the efficiency of the cycloid gear is increased.

Conceivable embodiments of transformation devices are for example cross-shaped and/or annular disks disposed between the cycloid disk and the output device, or rotatably supported eccentric rings disposed in eccentric through openings of the at least one output device. One peg of circular cross section, connected to a cycloid disk, each extends along the cylinder axis, through the inner circumference of the eccentric rings that is eccentrically offset from their outer circumference. Examples of transformation devices can be found among other places in the international patent disclosures of the present Applicant WO 95/22017 A1, WO 97/13989 A1, WO 2006/066807 A1, WO 2006/066813 A1, WO 2011/072707 A1, and EP 2 255 104 B1, the disclosures of which are hereby explicitly incorporated by reference in the present invention.

The reference faces that form pairs between the cycloid disk and the transformation device can fundamentally be embodied identically to the reference faces that form pairs between the transformation device and the output device.

In an embodiment with transformation devices as well, the output device can be formed of two revolute bodies connected to one another by spacer bodies. The spacer bodies can extend through eccentric through openings in the cycloid disks and also through eccentric through openings or corresponding recesses in the transformation devices, so that the cycloid disks of the cycloid gear are disposed between the transformation devices, and the transformation devices in turn are disposed between the revolute bodies of the output device.

A cycloid disk may for instance be embodied as a gear wheel with an outer set of teeth or as a cam disk. The contact between the housing and a cycloid disk by means of an inner set of teeth can for instance likewise be established with teeth or via roller and/or ball bearings.

The cycloid gear is distinguished by an even-numbered gear ratio. The even-numbered gear ratio preferably corresponds to a power of two, such as four, eight, sixteen, thirty-two, sixty-four, one hundred twenty-eight, two hundred fifty-six, five hundred twelve, etc.

To obtain the even-numbered gear ratio, the cycloid disks each have an even number of teeth.

Since the input shaft and output shaft of the cycloid gear can in principle be transposed, so that the cycloid gear can be used selectively for both a step down to a slow speed or a step up to a fast speed, an even-numbered gear ratio i, which indicates how many revolutions of the input shaft are needed to obtain one complete revolution of the output shaft, is even-numbered in the sense of the invention if i is an even number in the mathematical sense both when i>1 is an even number in the mathematical sense, and also when the quotient is 1/i when i<1 is an even number in the mathematical sense.

Accordingly, an even-numbered gear ratio i exists if the outer sets of teeth of the cycloid disks each have an even number of teeth N, and the inner set of teeth of the housing has a number of teeth N+Z or N−Z that is higher or lower by one (whole) number Z=1, and the quotient N/Z is an even number in the mathematical sense.

At this point it is important to stress that the inner set of teeth can have a number of teeth that is greater or lesser by one whole number, which leads to an even-numbered gear ratio i in the sense of the definitions given above.

The number of teeth indicated for the inner set of teeth is a desired number of teeth that is provided and/or necessary in the sense of the gear ratio i. According to the invention, however, without restricting the function and the mode of operation of the cycloid gear, it may be provided that with an even desired number of teeth of the inner set of teeth, for instance, an actual number of teeth of the inner set of teeth that is actually embodied can have only half as many teeth as the desired number of teeth. The teeth of the actual number of teeth are embodied identically and positioned identically to the teeth of the desired number of teeth provided, so that unlike the desired number of teeth, in the case of the actual number of teeth there are tooth gaps between two adjacent teeth only when one or two identical teeth of the inner sets of teeth finds space in those gaps. Accordingly, it is possible, with an odd actual number of teeth of the inner set of teeth, for every third or every fifth and so forth tooth, or each two of three, or two of five, or three of seven, and so forth, teeth are omitted, so that the inner set of teeth is simpler to produce without restricting the mode of operation and the function of the cycloid gear.

When a number of teeth of the inner set of teeth is discussed hereinafter, what is meant first is fundamentally a desired number of teeth of the inner set of teeth, unless something else is explicitly mentioned. However, this is neither a restriction such that the various embodiments described below should not be embodied with an actual number of teeth of the inner set of teeth as described, nor a restriction such that the various embodiments described below cannot be embodied with a desired number of teeth of the inner set of teeth as mentioned above.

The inner set of teeth of the housing preferably has a higher number of teeth, preferably a number of teeth higher by one than a cycloid disk. Thus the inner set of teeth on the housing preferably has an odd number of teeth that is higher by one.

In order to be able, despite an odd number of teeth of the inner set of teeth and an even number of teeth of the cycloid disks when there are two or more cycloid disks, to be able to rotatably dispose eccentric portions disposed uniformly rotated about the input shaft, whose motions as they roll on the inner housing face are converted by means of only one output device, associated with the cycloid disks, into rotary motions of the output shaft, the invention can provide the disposition of reference faces of cycloid disks, disposed rotationally relative to one another about the cylinder axis, by an offset of their angular position about their rotary axis relative to the outer set of teeth of the cycloid disks. The offset of the mutual rotation results from the quotient of the difference between the number of teeth of the inner set of teeth and the outer set of teeth and the number of cycloid disks, rotated in various rotary positions and associated with an output device.

If two cycloid disks of a cycloid gear according to the invention, equipped with two cycloid disks rotated by 180° from one another, with the same orientation of their reference faces are located directly one above the other, and if their rotary axes are identical then beginning at a first cycloid disk, the outer set of teeth of the remaining second cycloid disk is disposed rotationally relative to the first cycloid disk by the offset.

If three or n cycloid disks of a cycloid gear of the invention, equipped with three or n cycloid disks rotated from one another by 120° or correspondingly 360°/n are located, with the same orientation of their reference faces, directly one above the other and if their rotary axes are identical, then the outer sets of teeth of the respective cycloid disks are rotated from one another by the offset.

In order, despite an odd number of teeth of the inner set of teeth and an even number of teeth of the cycloid disks when there are two or more cycloid disks, to be able to dispose eccentric portions at uniform rotary positions about the input shaft, the motions of which as they roll on the inner housing face are converted by means of only one output device, associated with the cycloid disks, into rotary motions of the output shaft, the invention can provide alternatively that annular parts associated with the individual cycloid disks are associated with the inner set of teeth/cycloid disk. Thus the cycloid gear includes a number of annular parts of the inner set of teeth that corresponds to the number of cycloid disks. Each annular part of the inner set of teeth can be embodied with a set of teeth having the same number of teeth. The sets of teeth of the annular parts of the inner set of teeth, associated with cycloid disks rotated relative to one another about the cylinder axis, are rotated relative to one another by an offset of their angular position about the cylinder axis. The offset of the relative rotation is obtained from the quotient of the difference between the number of teeth of the inner set of teeth and the outer set of teeth and the number of cycloid disks rotated in various rotary positions and associated with an output device.

If two cycloid disks rotated by 180° relative to one another are provided, then two annular parts of the inner set of teeth are provided, whose sets of teeth are disposed on the inner housing wall, rotated relative to one another by the offset, about the cylinder axis.

If three or more rotated cycloid disks are provided, then correspondingly three or more annular parts of the inner set of teeth are provided, the sets of teeth of which are disposed on the inner housing wall, disposed rotationally uniformly relative to one another about the cylinder axis by the offset.

In order to be able, despite an odd number of teeth of the inner set of teeth and an even number of teeth of the cycloid disks when there are two or more cycloid disks, to be able to rotatably dispose eccentric portions disposed uniformly rotated about the input shaft, whose motions as they roll on the inner housing face are converted by means of only one output device, associated with the cycloid disks, into rotary motions of the output shaft, in a third alternative, the invention can provide an even-numbered difference in number of teeth of the inner set of teeth on the housing and of the outer sets of teeth of the cycloid disks.

It can be seen that the invention can be realized by means of a single-stage cycloid gear including two or more eccentrically driven cycloid disks, each offset from one another by means of an input shaft provided with a corresponding number of eccentrics disposed rotationally uniformly relative to one another, and the cycloid disks roll in a housing. A cycloid disk can for instance be embodied as a gear wheel with an outer set of teeth, or as a cam disk. The contact between the housing and a cycloid disk can be established for instance by means of an inner set of teeth, also with teeth or via roller and/or ball bearings. An output device converts the motions of the one or more cycloid disks, as they roll in the housing, into a rotary motion of an output shaft. The output device, for converting the motions of the at least one cycloid disk, is operatively connected to one or more reference faces of the at least one cycloid disk, for instance guideways and/or protrusions and/or grooves and/or eccentric through openings, all disposed on a cycloid disk, to name only some conceivable embodiments. Roller bearings and/or rolling elements can be provided between the output device and the reference faces. Each of the cycloid disks has an even number of teeth, while conversely the housing has an inner set of teeth with an odd number of teeth. To enable a uniformly rotated disposition of the two or more cycloid disks about the input shaft, the reference faces of cycloid disks rotated relative to one another are rotated relative to their outer set of teeth by an offset of their angular position about their rotary axis. The offset of the relative rotation results from the quotients of the difference of the number of teeth of the inner set of teeth and the outer set of teeth and the number of cycloid disks rotated in various rotary positions.

For example, if two, four or eight, etc., cycloid disks offset by 180° are provided where there is a difference in the number of teeth of the inner set of teeth and the outer set of teeth of one, then the reference faces of half of the cycloid disks each rotated by 180° relative to one another, compared to the teeth whose outer set of teeth in comparison to the other half of the cycloid disks each rotated by 180° from one another, are disposed offset by one half of a tooth.

For example, if three, six or nine, etc., cycloid disks offset by 120° are provided where there is a difference in the number of teeth of the inner set of teeth and the outer set of teeth of one, then the reference faces of one-third of the cycloid disks each rotated by 120° relative to one another, compared to the teeth whose outer set of teeth in comparison to the remaining thirds of the cycloid disks each rotated by 120° from one another, are disposed offset by one third of a tooth.

Advantages over the prior art include, besides overcoming the disadvantages of the prior art mentioned at the outset, an even-numbered gear ratio, with which even for actuating drives, for instance, especially suitable gear ratios of a power of two can be realized.

Additional advantages over the prior art are less complex control of a drive of a single-stage cycloid gear that has two or more cycloid disks disposed rotationally uniformly about the input shaft, as well as less-complex calculation of the presetting of the rotation of the output shaft. This is associated with more-precise control and calculation, compared with an odd-numbered gear ratio.

Figure 2:
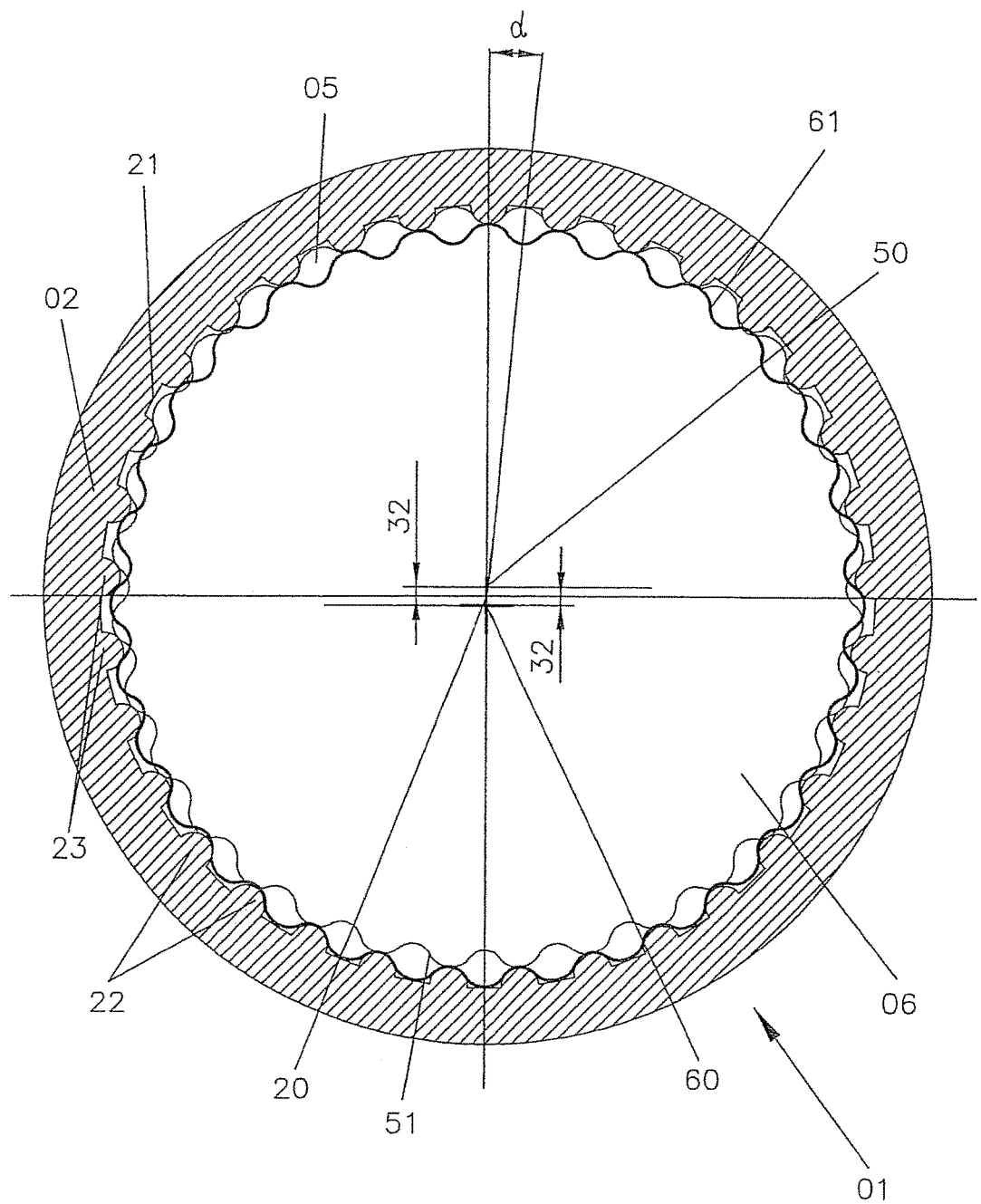
Figure 3:
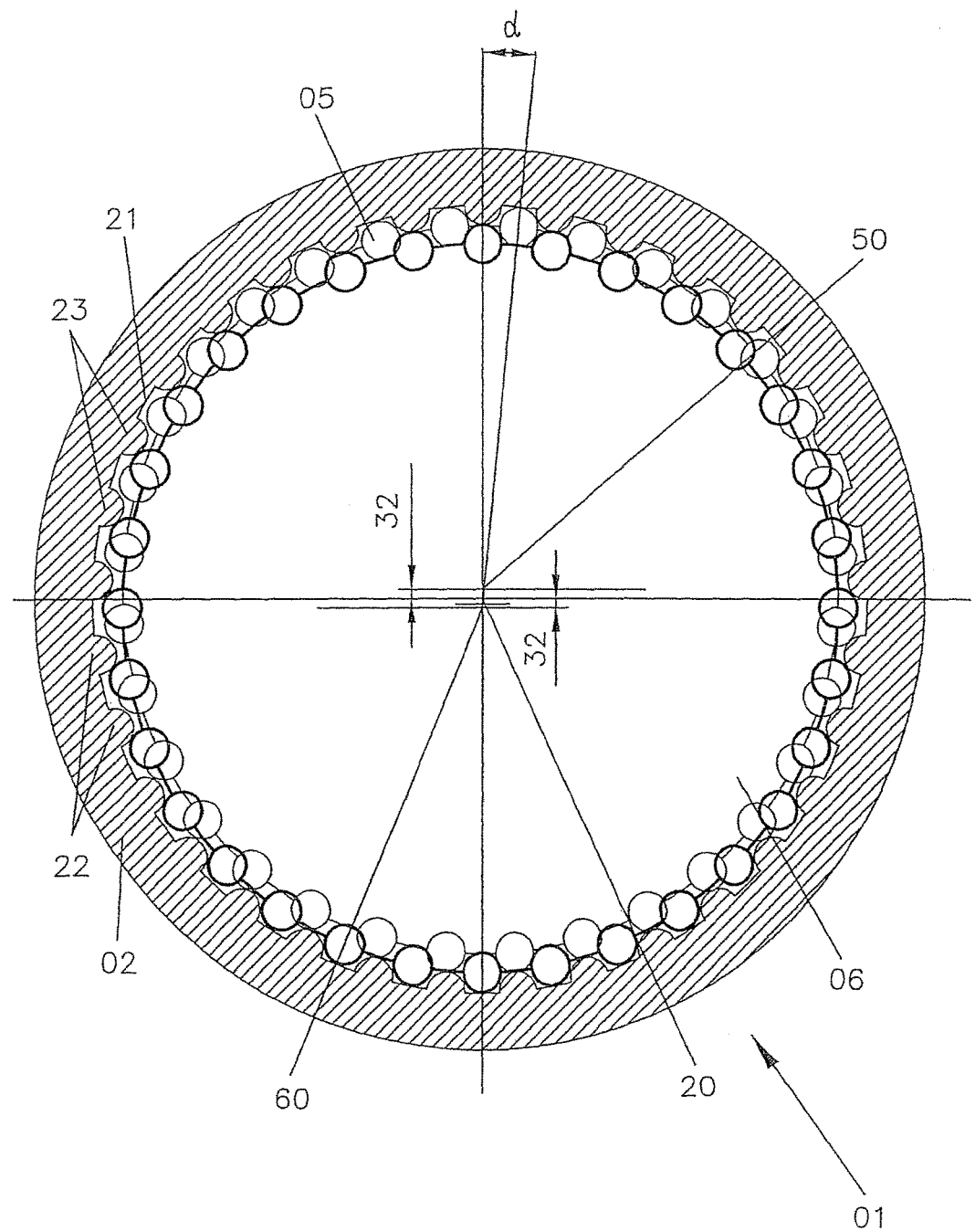
Figure 4:
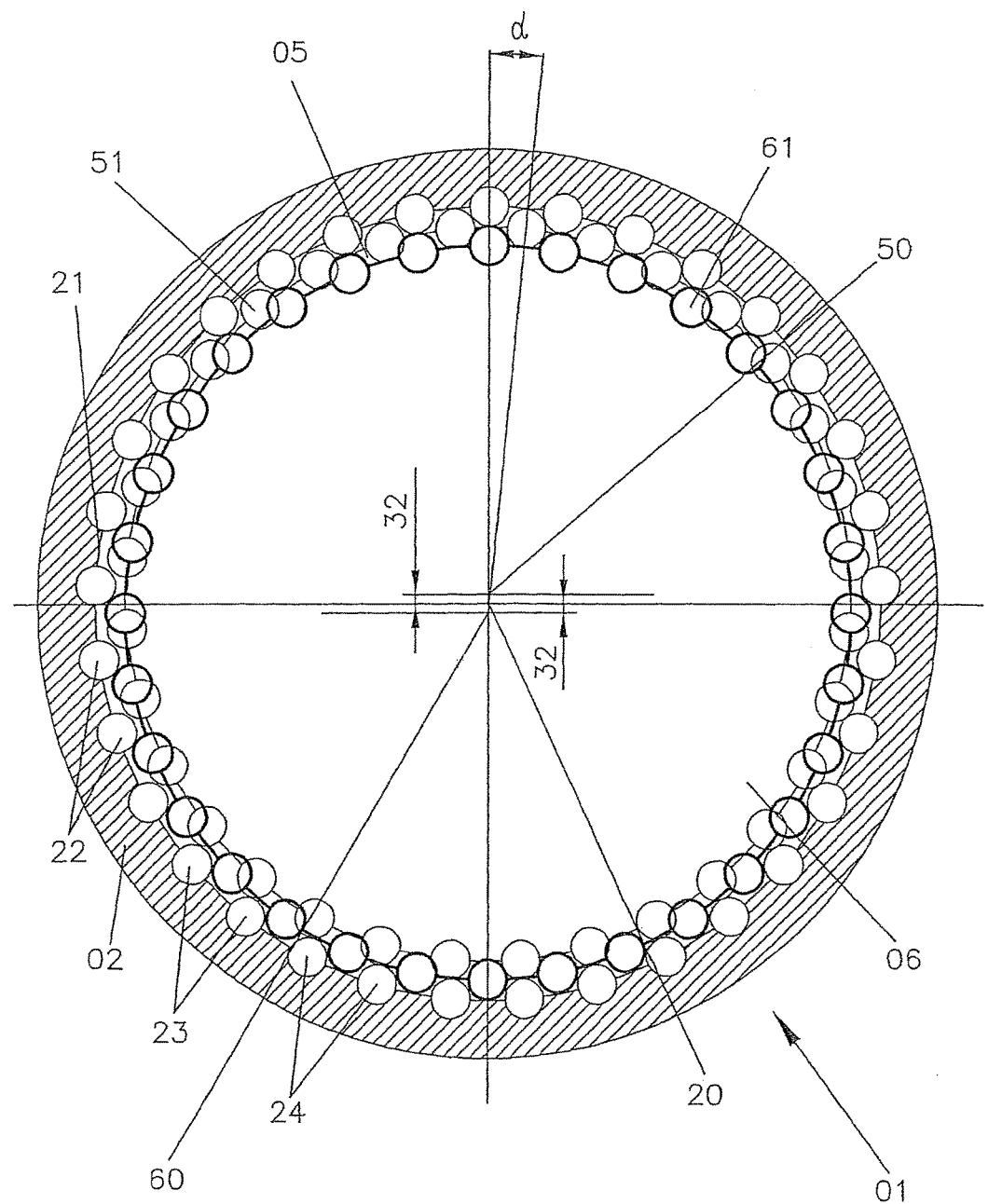

The invention will be described in further detail below in conjunction with exemplary embodiments shown in the drawings. In the drawings, the same reference numerals represent identical or identically acting elements. For the sake of simplicity, in the individual drawings only reference numerals that are necessary for describing that particular drawing are shown. The size ratios of the various elements to one another are not always the actual size ratios, since some shapes have been simplified and other shapes enlarged for the sake of greater clarity, compared to other elements. In the drawings, the following are shown schematically:

FIG. 1, a first exemplary embodiment of a cycloid gear, having two cycloid disks offset from one another by 180°, in a cross section, normally to the cylinder axis;

FIG. 2, a second exemplary embodiment of a cycloid gear, having two cycloid disks offset from one another by 180°, in a cross section, normally to the cylinder axis;

FIG. 3, a third exemplary embodiment of a cycloid gear, having two cycloid disks offset from one another by 180°, in a cross section, normally to the cylinder axis;

FIG. 4, a fourth exemplary embodiment of a cycloid gear, having two cycloid disks offset from one another by 180°, in a cross section, normally to the cylinder axis;

FIG. 5, a fifth exemplary embodiment of a cycloid gear with two cycloid disks offset by 180° from one another, in which FIG. 5.1 is a longitudinal section parallel to the cylinder axis, FIG. 5.2 is a first cross section, normal to the cylinder axis, showing a first cycloid disk, and FIG. 5.3 is a second cross section, normal to the cylinder axis, showing a second cycloid disk;

FIG. 6, a sixth exemplary embodiment of a cycloid gear with two cycloid disks offset by 180° from one another, in which FIG. 6.1 is a longitudinal section parallel to the cylinder axis, FIG. 6.2 is a first cross section, normally to the cylinder axis, showing a first cycloid disk, and FIG. 6.3 is a second cross section, normal to the cylinder axis, showing a second cycloid disk;

FIG. 7, a seventh exemplary embodiment of a cycloid gear with two cycloid disks offset by 180° from one another, in which FIG. 7.1 is a longitudinal section parallel to the cylinder axis, FIG. 7.2 is a first cross section, normal to the cylinder axis, showing a first cycloid disk, and FIG. 7.3 is a second cross section, normally to the cylinder axis, showing a second cycloid disk;

FIG. 8, an eighth exemplary embodiment of a cycloid gear with three cycloid disks offset by 120° from one another, in which FIG. 8.1 is a longitudinal section parallel to the cylinder axis, FIG. 8.2 is a first cross section, normal to the cylinder axis, showing the positions of the cycloid disks, FIG. 8.3 is a second cross section, normally to the cylinder axis, showing a second cycloid disk, and FIG. 8.4 shows alternative embodiments of the inner sets of teeth of the cycloid gear in a longitudinal section parallel to the cylinder axis;

FIG. 9, a ninth exemplary embodiment of a cycloid gear with two cycloid disks offset from one another by 180° as well as transformation devices, in which FIG. 9.1 is a longitudinal section parallel to the cylinder axis, FIG. 9.2, in a first cross section, normal to the cylinder axis, shows a first cycloid disk and a first transformation device associated with it, FIG. 9.3 is a second cross section, normal to the cylinder axis, showing a second cycloid disk and a second transformation device associated with it, FIG. 9.4 is a perspective view only of its housing, the inner set of teeth, the two cycloid disks offset from one another 180°, an input shaft with two eccentric portions rotated identically about their longitudinal axis and having the same eccentricity, and FIG. 9.5 is an exploded view of the cycloid gear in perspective;

FIG. 10, exemplary embodiments for the design of the inner set of teeth of the housing, in FIG. 10.1 with rotatably supported bolts as teeth of the inner set of teeth, in FIG. 10.2 with rotatably supported rollers as teeth of the inner set of teeth, and in FIG. 10.3 with rotatable ball bearings as teeth of the inner set of teeth, in each case in a cross section normally to the cylinder axis.

A cycloid gear 01, shown in FIGS. 1-9 either entire or in part, includes a housing 02 with a concentric (hollow-) cylindrical inner housing wall 21 disposed about a cylinder axis 20 that is perpendicular to the plane of the drawing in FIG. 1, FIG. 2, FIG. 3, FIG. 4, FIG. 5.2, FIG. 5.3, FIG. 6.2, FIG. 6.3, FIG. 7.2, FIG. 7.3, FIG. 8.2, FIG. 9.2, and FIG. 9.3. The inner housing wall 21 is provided with an inner set of teeth 22. The teeth 23 of the inner set of teeth 22 can extend parallel or obliquely or in inclined fashion.

A cycloid gear 01 further includes an input shaft 03, supported rotatably in or on the housing 02 about the cylinder axis 20, with at least two eccentric portions 31 of identical eccentricity 32 that either singly or in groups, for instance in pairs, are disposed rotationally uniformly about the longitudinal axis 30 of the input shaft 03 that coincides with the cylinder axis.

Moreover, a cycloid gear 01 includes an output shaft 04 supported in or on the housing 02 rotatably about the cylinder axis 20. The longitudinal axis 40 of the output shaft 04 coincides with the cylinder axis 20.

Furthermore, a cycloid gear 01 includes at least two cycloid disks 05, 06, 07. Each cycloid disk 05, 06, 07 is disposed rotatably about its own central rotary axis 50, 60, 70 on an eccentric portion 31 of the input shaft 03. Each cycloid disk 05, 06, 07 has an output shaft 51, 61, 71 that meshes with the inner set of teeth 22 of the cylindrical inner housing wall 21. The rotary axis 50, 60, 70 of each cycloid disk 05, 06, 07 is offset from the cylinder axis 20 by the eccentricity 32 of the eccentric portion 31. The diameter of the cycloid disks 05, 06, 07 is dimensioned such that their outer set of teeth 51, 61, 71, in one direction, enters in meshing fashion into engagement with the inner set of teeth 22 of the cylindrical inner housing wall 21, which is the direction the eccentric portion 31, on which a cycloid disk 05, 06, 07 is disposed, is pointing at the moment. Conversely, in the opposite direction, the outer set of teeth 51, 61, 71 is free of an engagement with the inner set of teeth 22 of the cylindrical inner housing wall 21. As a result, the cycloid disks 05, 06, 07 can roll on the inner housing wall 21.

The cycloid disks 05, 06, 07, on or in at least one of their end faces 52, 62 that extend normally to their rotary axis 50, 60, 70, each have reference faces 53, 63.

Because of the support of the cycloid disks 05, 06, 07 on the eccentric portions, the cycloid disks 05, 06, 07, as they roll in the housing 02, execute back and forth relative motions orthogonally with respect to the output shaft 04. The reference faces 53, 63 serve the purpose of torque transmission from the cycloid disks 05, 06, 07 to at least one output device 08, supported on or in the housing 02 rotatably about the cylinder axis 20, by converting the motions of the cycloid disks 05, 06, 07 as they roll in the housing 02 into a rotary motion of the output shaft 04. Each reference face 53, 63 can include one or more face portions located in one or more planes extending parallel to the cylinder axis 20. Thus for the reference faces 53, 63 it can be said in general true that they extend parallel to the cylinder axis 20 and thus also parallel to the rotary axis 50, 60, 70 of the cycloid disks 05, 06, 07. A straight line including the cylinder axis 20 here is parallel to a face, if it is either located entirely in a plane that includes the face or does not intersect it. As a result, alternatively or additionally to flat faces, the reference faces 53, 63 can also include cylindrical outer faces of protrusions that protrude parallel to the cylinder axis 20 from the cycloid disks 05, 06, 07, such as pegs and/or cylindrical inner faces, protruding approximately normally to one or both face ends 52, 62 of the cycloid disks 05, 06, 07, of recesses, extending parallel to the cylinder axis 20, in the cycloid disks 05, 06, 07, such as the inner faces of eccentric through openings 55, 65 and/or blind bores provided for instance in the cycloid disks 05, 06, 07. The reference faces 53, 63 permit these back and forth motions relative to a rotary motion of the output shaft 04 with simultaneous torque transmission.

As already mentioned, a cycloid gear 01 further includes at least one output device 08, supported rotatably about the cylinder axis 20, which is operatively connected to one or more reference faces 53, 63 of at least one cycloid disk 05, 06, 07 such that the motions of one or more cycloid disks 05, 06, 07, as they roll in the housing 02, are converted into a rotary motion of the output shaft 04.

The cycloid gears 01 shown entirely or in part in FIGS. 1-9 are distinguished by an even-numbered gear ratio. The cycloid disks 05, 06, 07 each have an even number of teeth N of their outer sets of teeth 51, 61, 71.

The number of teeth N is a whole number in the mathematical sense, which is called even if it can be divided two without a remainder. Otherwise, it is called odd.

To obtain an even-numbered gear ratio, the inner set of teeth 22 of the housing 02 has a number of teeth N+Z or N−Z that is higher or lower than a whole number Z, compared to the outer sets of teeth 51, 61, 71 of the cycloid gears 05, 06, 07.

In the fixed housing 02, the cycloid disks 05, 06, 07, each disposed on an eccentric portion 31 of the input shaft 03 of the cycloid gear 01 and each having N teeth, roll with N+Z or N−Z teeth over the teeth of the housing 02. With each revolution of the input shaft 03 and thus of the eccentric portion 31, the cycloid disks 05, 06, 07 and with them the output shaft 04 move onward by Z teeth. The result is lower rotary speeds counter to the direction of rotation of the input shaft 03. The gear ratio i, for which i=abs (N/((N+Z)−N) and i=abs (N((N−Z)−N), respectively, is equivalent to the quotient of the number N of teeth of the cycloid disk 05, 06, 07 and the difference in the number of teeth N+Z and N−Z, respectively, of the inner set of teeth 22 of the housing 02 and the number N of teeth of the cycloid disks 05, 06, 07. The result for the gear ratio i is the quotient of the number N of teeth of the cycloid disks 05, 06, 07 and the number of teeth Z of the inner set of teeth 22 of the housing 02 that is higher or lower relative to the cycloid disk 05, 06, 07, corresponding to i=abs (N/Z).

The input and output shafts of a cycloid gear can be transposed, since cycloid gears do not have a self-locking effect. The gear ratio i, which indicates how many revolutions of the input shaft 03 are required in order to obtain one full revolution of the output shaft 04, is even, in the sense of the invention, if the result i=abs (N/Z) is an even number in the mathematical sense, regardless of whether the input shaft 03 and output shaft 04 are transposed.

The cycloid disks 05, 06, 07, which roll in the housing 02, can for instance each be embodied as a gear wheel with an outer set of teeth 51, 61, or as a cam disk. The contact between the housing 02 and a cycloid disk 05, 06, 07 can be established for instance by means of an inner set of teeth 22, also with teeth 23, or, as shown in FIG. 10, via bolts supported rotatably and combined under the term roller element 24 (FIG. 10.1), rotatably supported rollers (FIG. 10.2), and/or rotatable ball bearings (FIG. 10.3). Still other embodiments of sets of teeth between cycloid disks 05, 06, 07 and the housing 02, which allow the cycloid disks 05, 06, 07 to roll upright, meshing in form-locking fashion, in engagement with the housing 02, in the housing 02, are conceivable. They make a zigzag-like, form-locking connection for force and motion transmission, for instance.

For the sake of simplicity, the terms tooth and set of teeth will also be used to stand for all conceivable embodiments of the contact between the cycloid disk 05, 06, 07 and the housing 02, whether or not a special embodiment is explicitly discussed.

The cycloid disks 05, 06, 07 with their outer set of teeth 51, 61, 71 can, as shown in FIG. 3 and FIG. 4, be embodied as gear wheels, or, as shown in FIG. 1, FIG. 2 and FIG. 10, as cam disks.

The contact between the housing 02 and a cycloid disk 05, 06, 07 can, as shown in FIG. 2 and FIG. 3, be established by means of the inner set of teeth 22 with fixed teeth 23 or, as shown in FIG. 1 and FIG. 4, by means of the inner set of teeth 22, with rotatable teeth 23 that include roller elements 24 and/or ball bearing elements.

The even-numbered gear ratio i preferably corresponds to a power of two, such as four, eight, sixteen, thirty-two, sixty-four, one hundred twenty-eight, two hundred fifty-six, five hundred twelve, etc.

The inner set of teeth 22 of the housing 02 preferably, as shown in FIGS. 1-9, has a number of teeth that is higher by an odd number than the respective outer sets of teeth 51, 61, 71 of the cycloid disks 05, 06, 07. Preferably, this is a number of teeth higher by one than that of an outer set of teeth 51, 61, 71 of a cycloid disk 05, 06, 07. Thus the inner set of teeth 22 on the housing 02 preferably has an odd number of teeth that is higher by one.

Based on a relative rotary position or orientation of the reference faces 53, 63 to the outer set of teeth 51, 61, 71 of one cycloid disk 05, 06, 07 of two or more cycloid disks 05, 06, 07 rotated relative to one another about the cylinder axis 20, the reference faces 53, 63 of the at least one remaining cycloid disk 06, 07, 05 of the cycloid disks 05, 06, 07 rotated relative to one another about the cylinder axis 20 can be rotated by an offset d of their angular position about their rotary axis 50, 60, 70, in order, despite an odd number N+Z or N−Z of teeth 23 of the inner set of teeth 22 and an even number N of teeth of the outer sets of teeth 51, 61, 71 of the cycloid disks 05, 06, 07, to be able to dispose two or more cycloid disks 05, 06, 07 rotatably on eccentric portions 31 that are disposed uniformly rotationally about the input shaft 03. As they roll on the inner housing face 21, their motions are converted into rotary motions of the output shaft 04 by means of only one output device 08 associated with these cycloid disks 05, 06, 07. The offset d, which is especially clearly apparent in FIG. 1, FIG. 2, FIG. 3 and FIG. 4, of the relative rotation of the two cycloid disks 05, 06 shown there results from the quotient of the difference between the number of teeth N+Z or N−Z of the inner set of teeth 22 and the number of teeth N of the outer set of teeth 51, 61, 71, on the one hand, and on the other the number of cycloid disks 05, 06, 07 rotated in various rotary positions and associated with an output device 08. The offset d indicates the amount by which, related to the gear wheel pitch and the modulus of the outer sets of teeth 51, 61, 71 of the cycloid disks 05, 06, 07, the reference faces 53, 63 of a first cycloid disk 05, 06, 07 are rotated relative to a second cycloid disk 06, 07, 05 or relative to the outer set of teeth 61, 71, 51 of a second cycloid disk 06, 07, 05 while the outer sets of teeth 51, 61, 71 of the cycloid disks 05, 06, 07 are disposed congruently.

If two cycloid disks 05, 06 of a cycloid gear 01, equipped with two cycloid disks 05, 06 rotated by 180° relative to one another, are located directly one above the other with the same orientation of their reference faces 53, 63, and if their rotary axes 50, 60 are identical, then beginning at a first cycloid disk 05, the outer set of teeth of the remaining cycloid disk 06 is rotated by the offset d relative to the first cycloid disk 05 (FIGS. 1-7 and FIG. 9).

If three or n cycloid disks 05, 06, 07 of a cycloid gear 01 equipped with three or n cycloid disks 05, 06, 07 that are disposed 120° or correspondingly 360°/n from one another are located directly one above the other with the same orientation of their reference faces 53, 63, and if their rotary axes 50, 60, 70 are identical, then beginning at a first cycloid disk 05, the outer sets of teeth 51, 61, 71 of the cycloid disks 05, 06, 07 is rotated by the offset d relative to the first cycloid disk 05 (FIG. 8).

Alternatively to an offset d of the relative rotation of the relative position of the outer set of teeth 51, 61, 71 to reference faces 53, 63, it is possible, as shown in FIG. 7, for annular parts 25, 26 of the inner set of teeth 22 that are associated with the individual cycloid disks 05, 06 to be provided. Each annular part 25, 26 of the inner set of teeth 22 is associated with one cycloid disk 05, 06. The cycloid gear 01 includes a number of annular parts 25, 26 of the inner set of teeth 22 that corresponds to the number of cycloid disks 05, 06. The sets of teeth of the annular parts 25, 26 of the inner set of teeth 22 that are associated with cycloid disks 05, 06 rotated relative to one another about the cylinder axis 20 are rotated relative to one another about the cylinder axis 20 by an offset d of their angular position. This offset d of the mutual rotation results from the quotient between the difference of the number of teeth N+Z or N−Z of the inner set of teeth 22 and the number of teeth N of the outer sets of teeth 51, 61, on the one hand, and the number of the cycloid disks 05, 06 that are rotated in various rotary positions and are associated with one output device 08. By this means as well, despite an odd number of teeth 23 of the inner set of teeth 22 and an even number of teeth of the outer sets of teeth 51, 61 of the cycloid disks 05, 06, two or more cycloid disks 05, 06 can be disposed rotatably on eccentric portions 31 that are disposed rotationally uniformly about the input shaft 03; as they roll on the inner housing face 21, their motions are converted into rotary motions of the output shaft 04 by means of only one output device 08 associated with these cycloid disks 05, 06. Here, the offset d indicates the amount by which, referred to the gear wheel pitch or the modulus of the inner set of teeth 22, the one annular part 25 of the inner set of teeth 22 is rotated relative to the other annular part 25 of the inner set of teeth 22 with respect to the cylinder axis 20.

As a result, the cycloid disks 05, 06 can be produced identically, and the reference faces 53, 63 of both cycloid disks 05, 06 are disposed in the same rotary position relative to their outer sets of teeth 51, 61.

If two cycloid disks 05, 06 rotated by 180° relative to one another are provided, then two annular parts 25, 26 of the inner set of teeth 22 are provided, whose sets of teeth are disposed rotationally on the inner housing wall 21 by the offset d, for instance an offset d of one half of a tooth, when there is a difference between the number of teeth of the inner set of teeth 22 of the housing 02 and the outer sets of teeth 51, 61 of the cycloid disks 05, 06.

If three or more cycloid disks 05, 06, 07 disposed in rotated fashion are provided, then correspondingly three or more annular parts 25, 26 of the inner set of teeth 22 are provided, whose sets of teeth are disposed on the inner housing wall 21, disposed rotationally uniformly relative to one another by the offset d about the cylinder axis 20.

An additional variant for being able, despite an even number of teeth 23 of the outer sets of teeth 51, 61, 71 of the cycloid disks 05, 06, 07, to dispose two or more cycloid disks 05, 06, 07 rotatably on eccentric portions that are uniformly rotated about the input shaft, the motions of which, as they roll on the inner housing face 21, are converted into rotary motions of the output shaft 04 by means of only one output device 08 associated with these cycloid disks 05, 06, 07, is obtained by providing that the inner set of teeth 22 of the housing 02 has a number of teeth that is higher by an even number Z than the respective outer sets of teeth 51, 61, 71 of the cycloid disks 05, 06, 07.

The output device 08 can be formed from two revolute bodies 81, 82 connected to one another by means of spacer bodies 80. The cycloid disks 05, 06, 07 of the cycloid gear 01 are disposed between the revolute bodies 81, 82 of the output device 08. The spacer bodies 80 can extend through eccentric through openings 55, 65 in the cycloid disks 05, 06, 07. The spacer bodies 80 can be separate components, connected to the revolute bodies 81, 82 by means of connecting elements, such as screws 83 and/or bolts. Alternatively, the spacer bodies 80 can be produced in one piece with one of the revolute bodies 81, 82. Selectively, at least one spacer body 80 can be connected in one piece with a first revolute body 81, and at least one remaining body 80 can be connected in one piece with a remaining second revolute body 82. It is also conceivable for the spacer bodies 80 to be split in two, as shown in FIG. 9.1 and FIG. 9.5. One spacer body stump 84, 85 each of two spacer body stumps 84, 85 that form one spacer body 80, is disposed on, or connected in one piece to, and/or produced on one revolute body 81, 82.

The at least one output device 08 can be connected to, surround, or be surrounded by the output shaft 04.

The same number of cycloid disks 05, 06, 07 is disposed rotatably on each eccentric portion 31 of the input shaft 03, and preferably, one cycloid disk 05, 06, 07 is disposed rotatably on each eccentric portion 31.

Between the output device 08 and each cycloid disk 05, 06, 07, one transformation device 09 can be provided. The output device 08 here, like the cycloid disks 05, 06, 07, has one or more reference faces 86, provided for torque transmission from one or more cycloid disks 05, 06, 07 to the output device.

As the cycloid disks 05, 06, 07 roll in the housing 02 with the inner set of teeth 22, the cycloid disks 05, 06, 07 execute transverse motions with respect to the cylinder axis 20 of the housing 02 in all directions normally to the cylinder axis 20 and thus also normally to the longitudinal axis 40 of the output shaft 04, corresponding to two degrees of freedom normally to the cylinder axis 20. Upon the conversion of the motions, which can also be called planetary motions, of the cycloid disks 05, 06, 07 as they roll into rotary motions of the output shaft 04, these transverse motions in all directions of the cycloid disks 05, 06, 07 must remain executable with respect to the cylinder axis 20 of the housing 02 with the inner set of teeth 22. In a conventional direct conversion of the motions of cycloid disks 05, 06, 07 into rotary motions of the output shaft 04 by means of eccentrically disposed pegs, standing upright parallel to the cylinder axis on the output device 09 or on the cycloid disks 05, 06, 07 and corresponding recesses or openings on the respective counterpart, i.e. on the cycloid disks or on the output device, which corresponding recesses or openings permit a motion of the pegs corresponding to the eccentricity 32 of the eccentric portions 31, only a point or linear contact between cycloid disks 05, 06, 07 and the output device 09 is available for torque transmission. This severely restricts the performance of a cycloid gear 01, which seeks to combine high power levels in particular in the least possible space.

A transformation device provided between the output device 08 and a cycloid disk 05, 06, 07 overcomes this restriction, since it forms an intermediate stage for both required translational degrees of freedom normally to the cylinder axis 20. To that end, the transformation device 09 is connected movably to a cycloid disk in such a way that a cycloid disk 05, 06, 07 can execute relative motions, relative to the transformation device 09, in a first direction normally to the cylinder axis 20, while conversely, relative motions in a second direction, which extends perpendicular to the first direction, are prevented. Moreover, the transformation device 09 is movably connected to the output device 08 in such a way that the transformation device 09 can execute relative motions relative to the output device 08 in the second direction normally to the cylinder axis 20, while conversely, relative motions in the first direction, which extends perpendicular to the second direction, are prevented.

As a result, an indirect conversion of the motions of cycloid disks 05, 06, 07 into rotary motions of the output shaft 04 by means of a transformation device 09 disposed between each cycloid disk 05, 06, 07 and the output device 08, makes a linear or area contact possible between it and a cycloid disk 05, 06, 07 and between it and the output device 08. Via this linear or area contact, substantially higher torques can be transmitted than via a point or linear contact in the direct conversion, described above, of the motions of cycloid disks 05, 06, 07 into rotary motions of the output shaft 04 directly by means of the output device 08.

The use of a transformation device 09 thus makes it possible, for torque transmission from the cycloid disks 05, 06, 07 to the output device 08, to embody reference faces 53, 63 that are provided on the cycloid disks 05, 06, 07 and extend parallel to the rotary axis 50, 60, 70 of the cycloid disks 05, 06, 07; within the plane they define, these reference faces 53, 63 permit relative motions transversely to the rotary axis 50, 60, 70 of the respective cycloid disk 05, 06, 07.

To ensure a corresponding first degree of freedom between the corresponding cycloid disk 05, 06, 07 and the output device 08 normally to the cylinder axis 20 or normally to the rotary axis 50, 60, 70 of the respective cycloid disk 05, 06, 07, each transformation device 09 has reference faces 93, which correspond to the reference faces 53, 63 of the respective cycloid disk 05, 06, 07. This first degree of freedom allows back and forth motions of the respective cycloid disk 05, 06, 07 relative to the transformation device 09 in a first direction normally to the cylinder axis 20 or normally to the rotary axis 50, 60, 70 of the corresponding cycloid disk 05, 06, 07.

To ensure a corresponding second degree of freedom between the corresponding cycloid disk 05, 06, 07 and the output device 08 normally to the cylinder axis 20 or normally to the rotary axis 50, 60, 70 of the respective cycloid disk 05, 06, 07, each transformation device 09 has reference faces 96, which correspond to the reference faces 86 of the output device 08.

This second degree of freedom allows back and forth motions of the transformation device 09 relative to the output device 08 in a second direction normally to the cylinder axis 20 or normally to the rotary axis 50, 60, 70 of the corresponding cycloid disk 05, 06, 07. This direction moreover extends normally to the first direction, in which the respective cycloid disk 05, 06, 07 can execute relative motions relative to the transformation device 09.

As a result, corresponding pairs of reference faces 53, 93 and 63, 93 result between each cycloid disk 05, 06, 07 and the transformation device 09 associated with it, as well as corresponding pairs of reference faces 96, 86 between the transformation device 09 and the output device 08. The pairs of reference faces 53, 93 and 63, 93 and 96, 86 allow translational relative motions in directions that are normally to the cylinder axis 20 between the cycloid disk 05, 06, 07 and the output device 08, and they prevent rotational relative motions about the cylinder axis 20 between the cycloid disk 05, 06, 07 and the output device 08. The transformation devices 09 execute intermediate motions, which, referred to the respective transformation device 09, are first back and forth intermediate motions in a first direction relative to the output device 08 and second back and forth intermediate motions in a second direction, orthogonal to the first direction, relative to the respective cycloid disk 05, 06, 07. The two first and second directions, which are perpendicular to one another, are located in a plane that extends normally to the cylinder axis 20.

Also in an embodiment with transformation devices 09, the output device 08 can be formed of two revolute bodies 81, 82 connected to one another by means of spacer bodies 80. The spacer bodies 80 can extend through eccentric through openings 55, 65 in the cycloid disks 05, 06, 07 as well as through eccentric through openings or corresponding recesses 95 in the transformation devices 09, so that the cycloid disks 05, 06, 07 of the cycloid gear 01 are disposed between the transformation devices 09, and the transformation devices in turn are disposed between the revolute bodies 81, 82 of the output device 08.

The reference faces 53, 63, 93, 86, 96 in and/or on the cycloid disks 05, 06, 07 and/or in and/or on the output device 08 and/or in and/or on the transformation device 09 can be the following elements corresponding with one another:
radially extending guideways normal to the cylinder axis and/or
protrusions and/or
grooves and/or
eccentrically disposed pins extending parallel to the cylinder axis, and/or
eccentrically disposed bolts extending parallel to cylinder axis, and/or
eccentric through openings extending parallel to the cylinder axis,
and combinations thereof.

Between cooperating reference faces 53, 93, 63, 93, 86, 96 of different elements of the cycloid gear 01, such as between the cooperating reference faces 53, 93, 63, 93 of cycloid disks 05, 06, 07 and transformation devices 09 and/or between the cooperating reference faces 96, 86 of transformation devices 09 and the output device 08, preferably roller bearings and/or rolling elements 10, such as roller bodies, are disposed. As a result, friction losses are reduced, and the efficiency of the cycloid gear 01 is increased.

It is important to stress that the essential advantage of the set of teeth with an even-numbered stepup is that in the calculations work can be done with an even number, which for instance makes the drive control of the gear, the rotation of the gear wheel, and the like simpler or more precise.

For the process of digitized control of servo drives that drive the gear, or of a control with actuators, modules or other units with an integrated gear, the optimal even-numbered stepups correspond to a power of two.

In FIG. 1, FIG. 2, FIG. 3 and FIG. 4, embodiments of sets of teeth of the type noted of gears with an even-numbered gear ratio and with a pair, also called wheel pair, of cycloid disks 05, 06 with an outer set of teeth 51, 61 with an even number of teeth 23 are shown. The cycloid disks 05, 06 are positioned in such a way that they are rotated relative to one another by 180° and at the same time are offset by an eccentricity 32 relative to the gear axis or horizontal axis, which in FIGS. 1-4 extends horizontally and coincides with the cylinder axis 20, of the inner set of teeth 22 of the housing 02 of the gear with an odd number of teeth. In the examples given, the outer set of teeth 61 on the second cycloid disk 06 is produced in such a way that it is rotated relative to the outer set of teeth 51 on the first cycloid disk 05 by a one-half spacing (that is, by an angle, a portion of 180/even-numbered stepup or an even number of teeth of the outer sets of teeth 51, 61 of the cycloid disks 05, 06).

FIG. 1 shows an exemplary embodiment of the set of teeth, comprising an inner set of teeth 22 with rolling elements or roller elements 24 with in an odd number of teeth 23 in the housing 02 and with a pair of cycloid disks 05, 06 with an outer set of teeth 51, 61; on the second cycloid disk 06, the outer set of teeth 61 is produced in such a way that it is rotated by an angle 180°/value of the even-numbered stepup relative to the outer set of teeth 51 of the remaining first cycloid disk 05. Some teeth 23 with rolling elements or roller elements 24 in the housing 02 can also be omitted, or corresponding grooves that together with rolling elements or roller elements 24 form teeth 23 need not be filled with rolling elements or roller elements 24. Some teeth of the outer sets of teeth 51, 61 of the cycloid disks 05, 06 can be omitted.

FIG. 2 shows an exemplary embodiment of the set of teeth, comprising an inner set of teeth 22 with in an odd number of teeth in the housing 02 and with a pair of cycloid disks 05, 06 with an outer set of teeth 51, 61. On the second cycloid disk 06, the outer set of teeth 61 is produced in such a way that it is rotated by an angle 180°/value of the even-numbered stepup relative to the outer set of teeth 51 of the remaining first cycloid disk 05. Some teeth 23 in the housing 02 can also be omitted.

FIG. 3 shows an exemplary embodiment of the set of teeth, comprising an inner set of teeth 22 with in an odd number of teeth 23 in the housing 02 and with a pair of cycloid disks 05, 06 with an outer set of teeth 51, 61 with rolling elements or roller elements 54, 64 in an even number of grooves on the cycloid disks 05, 06 as their outer sets of teeth 51, 61. On the second cycloid disk 06, the outer set of teeth 61 is produced in such a way that it is rotated by an angle 180°/value of the even-numbered stepup relative to the outer set of teeth 51 of the remaining first cycloid disk 05. Some grooves with rolling elements or roller elements 54, 64 in the cycloid disks 05, 06 can also be omitted or left unfilled with rolling elements or roller elements 54, 64. Some teeth 23 in the housing 02 can also be omitted, or corresponding grooves that together form teeth 23 do not need to be filled.

FIG. 4 shows an exemplary embodiment of the set of teeth, comprising an inner set of teeth 22 with in an odd number of grooves in the housing 02 with rolling elements or roller elements 54, 64 and with a pair of cycloid disks 05, 06 with an outer set of teeth 51, 61 with rolling elements or roller elements 54, 64 in an even number of grooves on the cycloid disks 05, 06 as their outer sets of teeth 51, 61. On the second cycloid disk 06, the outer set of teeth 61 is produced in such a way that it is rotated by an angle 180°/value of the even-numbered stepup relative to the outer set of teeth 51 of the remaining first cycloid disk 05. Some grooves with rolling elements or roller elements 24 in the cycloid disks 05, 06 can also be omitted or left unfilled with rolling elements or roller elements 24.

FIG. 5, in FIGS. 5.1, 5.2 and 5.3, shows one example of the disposition of the set of teeth from the exemplary embodiment of FIG. 1. FIG. 5.1 shows a sectional view A-A of FIG. 5.2 and FIG. 5.3. FIG. 5.2 shows a cross section, which shows a view of the engagement of the cycloid disk 05 with the inner set of teeth 22 on the housing 02. FIG. 5.3, conversely, shows a cross section which in the same state of the cycloid gear 01 shows a view of the engagement of the cycloid disk 06 with the inner set of teeth 22 on the housing 02.

FIG. 6, in FIGS. 6.1, 6.2 and 6.3, shows an example of the disposition of the set of teeth from the exemplary embodiment of FIG. 1. In the housing 02, two rows of rolling elements or roller elements 24 are disposed. Not all the grooves on the inner housing wall 21 need to be produced or filled with rolling elements or roller elements 24. Alternatively, some grooves on the inner housing wall 21 can be filled in combined fashion with one or two or more rolling elements or roller elements 24. The housing 02 of the cycloid gear 01 can be split into two or more parts, with grooves that after being connected form a unit. FIG. 6.1 shows a sectional view A-A of FIG. 6.2 and FIG. 6.3. FIG. 6.2 shows a cross section, which shows a view of the engagement of the cycloid disk 05 with the inner set of teeth 22 on the housing 02. FIG. 6.3, conversely, shows a cross section which in the same state of the cycloid gear 01 shows a view of the engagement of the cycloid disk 06 with the inner set of teeth 22 on the housing 02.

FIG. 7, in FIGS. 7.1, 7.2 and 7.3, shows a set of teeth with an even-numbered stepup. The housing 02 of the cycloid gear 01 forms a unit, comprising at least two parts 25, 26 of the inner set of teeth 22 with grooves with rolling elements or roller elements 24. The second part 26 is rotated relative to the first part 25 by an angle 180°/odd number of teeth 23 of the housing 02. The set of teeth of the two cycloid disks 05, 06 is identical. FIG. 7.1 shows a sectional view A-A of FIG. 7.2 and FIG. 7.3. FIG. 7.2 shows a cross section, which shows a view of the engagement of the cycloid disk 05 with the inner set of teeth 22 on the housing 02. Conversely, FIG. 7.3 shows a cross section which in the same state of the cycloid gear 01 shows a view of the engagement of the cycloid disk 06 with the part 26, rotated relative to the part 25 by an angle of 180°/odd number of teeth 23 of the housing 02 with the inner set of teeth 22 on the housing 02. This version with the splitting up of the inner set of teeth 22 of the housing 02 into a plurality of parts 25, 26 can be realized with sets of teeth of the kind realized also in the embodiments described above in conjunction with FIG. 1, FIG. 2, FIG. 3, and FIG. 4, but the second part of the inner set of teeth 22 of the housing 02 is rotated in the housing 02 by an angle 180°/odd number of teeth 23 or grooves, and the cycloid disks 05, 06 have an identical set of teeth. Not all the grooves on the housing 02 need to be produced or filled with rolling elements or roller elements 24. The parts 25, 26 can be formed by joined-together parts of the housing 02.

In FIG. 8, a version of set of teeth is shown with a difference of one between the number of teeth of the inner set of teeth 22 and the number of teeth of the outer sets of teeth 51, 61, 71 of the cycloid disks 05, 06, 07. The cycloid gear 01 shown in FIG. 8 also has an even-numbered gear ratio. The cycloid gear 01 shown in FIG. 8 has three cycloid disks 05, 06, 07 with an even number of teeth of their outer sets of teeth 51, 61, 71, as well as an inner set of teeth 22 on the inner housing wall 21 of the housing 02 with an odd number of teeth 23 or grooves with rolling elements or roller elements 24. The cycloid disks 05, 06, 07 all have identical outer sets of teeth 51, 61, 71. The cycloid disks 05, 06, 07 are mounted in such a way that they are rotated by 120° relative to one another and offset by an eccentricity 32. FIGS. 8.1, 8.3 and 8.4 here show a view of the set of teeth in section A-A with a different number of rolling elements or roller elements 24 in grooves of the cycloid gear 01, which grooves are provided on the inner housing wall 21 of the housing 02.

The sets of teeth can in turn be embodied as shown in FIGS. 1-4 and/or in FIG. 10.

In this connection, with reference to FIG. 10, it is important again to mention that:

the cycloid disks 05, 06, 07 can be embodied as a gear wheel or as a cam disk, and/or the contact between the housing 02 and the cycloid disks 05, 06, 07 can be established by means of fixed teeth 23 and/or by means of rotatable teeth formed by roller elements 24 and/or ball bearing elements.

Accordingly, the inner set of teeth 22 on the housing 02 can be embodied with fixed teeth 23 or with rotatable teeth embodied for instance as roller elements 24, and/or the outer sets of teeth 51, 61, 71 of the cycloid disks 05, 06, 07 can be embodied with fixed teeth 23 or with rotatable teeth embodied for instance as roller elements 24.

The roller elements 24 can be supported rotatably by being braced on bearing bushes 27, in the manner known from slide bearing arrangements (FIG. 10.1), or are supported on bearing bolts 28, as known from slide bearings (FIG. 10.2), or embodied as ball bearings 29 supported in bearing bolts 28, or supported rotatably on bearing bolts 28 by means of ball bearings 29 (FIG. 10.3).

Some grooves on the housing 02 or on the cycloid disks 05, 06, 07 need not be produced or filled with rolling elements or roller elements 24, or can be filled in combined fashion with one or two or more rolling elements or roller elements 24.

It is also important at this point again to mention that the inner set of teeth 22, beginning with a desired number of teeth provided and/or necessary in the sense of the gear ratio i, can have a lesser actual number of teeth; the teeth 23 at the actual number of teeth are embodied and positioned identically to the way they are embodied and positioned with the desired number of teeth. As a result, at the actual number of teeth, unlike the desired number of teeth, there are one or more tooth gaps between adjacent teeth 23, in which gaps one or more identical teeth 23 of the inner set of teeth 22 can find space.

The gear ratio i here remains unchanged for the actual number of teeth in comparison to the desired number of teeth, since the latter is dictated by the number of teeth N of the outer sets of teeth 51, 61, 71 of the cycloid disks 05, 06, 07.

It is even possible for teeth 23, for instance every second tooth 23, to be omitted in the outer sets of teeth 51, 61, 71 of the cycloid disks 05, 06, 07; the shape and angle of these teeth, each referred to a central rotary axis 50, 60, 70 of the respective cycloid disk 05, 06, 07 remains as when there are N teeth 23. As a result, the cycloid disks 05, 06, 07 continue to operate as if there were a number of N teeth 23.

The cycloid gear 01 can be provided for use in conjunction with an actuating drive.

The invention is commercially usable particularly in the field of the production of gears and of actuating drives.

LIST OF REFERENCE NUMERALS

01 Cycloid gear
02 Housing
03 Input shaft
04 Output shaft
05 Cycloid disk
06 Cycloid disk
07 Cycloid disk
08 Output device
09 Transformation device
10 Rolling element
20 Cylinder axis
21 Inner housing wall
22 Inner set of teeth
23 Tooth
24 Roller element
25 Part of the inner set of teeth (associated with the cycloid disk 05)
26 Part of the inner set of teeth (associated with the cycloid disk 06)
27 Bearing bush
28 Bearing bolt
29 Ball bearing
30 Longitudinal axis of the input shaft 03
31 Eccentric portion
32 Eccentricity
40 Longitudinal axis of the output shaft 04
50 Rotary axis of the cycloid disk 05
51 Outer set of teeth of the cycloid disk 05
52 Face end of the cycloid disk 05
53 Reference face of the cycloid disk 05
54 Roller element
55 Eccentric through opening in the cycloid disk 05
60 Rotary axis of the cycloid disk 06
61 Outer set of teeth of the cycloid disk 06
62 Face end of the cycloid disk 06
63 Reference face of the cycloid disk 06
64 Roller element
65 Eccentric through opening in the cycloid disk 06
70 Rotary axis of the cycloid disk 07
71 Outer set of teeth of the cycloid disk 07
80 Spacer body
81 Revolute body
82 Revolute body
83 Screw
84 Spacer stump
85 Spacer stump
86 Reference face of the output device 08
93 Reference face of the transformation device 09
95 Recess in the transformation device 09
96 Reference face of the transformation device 09
d Offset

The invention claimed is:

1. A cycloid gear (01), including:
a housing (02) with a cylindrical inner housing wall (21) disposed concentrically about a cylinder axis (20), inner housing wall (21) is provided with an inner set of teeth (22);
an input shaft (03), supported rotatably about the cylinder axis (20), having at least two eccentric portions (31) of identical eccentricity (32) that are disposed rotationally about a longitudinal axis (30) of the input shaft (03);
an output shaft (04), supported rotatably about the cylinder axis (20), in which the longitudinal axis (30) of the input shaft (03) and a longitudinal axis (40) of output shaft (04) coincide with the cylinder axis (20);
at least two cycloid disks (05, 06, 07), of which each cycloid disk (05, 06, 07) is disposed rotatably about its own central rotary axis (50, 60, 70) on its own single eccentric portion from among the at least two eccentric portions (31) and has an outer set of teeth (51, 61, 71), meshing with the inner set of teeth (22), and the rotary axis (50, 60, 70) of each cycloid disk (05, 06, 07) is offset by the eccentricity (32) to the cylinder axis (20), and the cycloid disks (05, 06, 07) include a diameter which is dimensioned such that their outer set of teeth (51, 61, 71) in one direction comes to mesh with the inner set of teeth (22), in which direction the eccentric portions (31), on which cycloid disks (05, 06, 0,7) are disposed, points at the moment, while conversely in an opposite direction, the outer set of teeth (51, 61, 71) is free of an engagement with the inner set of teeth (22); and at least one output device (08), supported rotatably about the cylinder axis (20), which output device converts the motions of one or more cycloid disks (05, 06, 07), as they roll in the housing (02), into a rotary motion of the output shaft (04), wherein an even-numbered gear ratio i is provided, which indicates how many revolutions of the input shaft (03) are required to obtain one complete revolution of the output shaft (04), and the outer sets of teeth (51, 61, 71) of the cycloid disks (05, 06, 07) each have an even number of teeth N, and the inner set of teeth (22) of the housing (02) has a number of teeth N+Z or N−Z that is higher or lower than a (whole) number Z, and the gear ratio i is even if i is an even number when i>1 or if 1/i is even when i<1.

2. The cycloid gear of claim 1, characterized in that the even-numbered gear ratio is equivalent to a power of two.

3. The cycloid gear of claim 1, characterized in that the inner set of teeth (22) of the housing (02) has a number of teeth higher by an odd number than the respective outer sets of teeth (51, 61, 71) of the cycloid disks (05, 06, 07).

4. The cycloid gear of claim 3, characterized in that the cycloid disks (05, 06, 07) each have reference faces (53, 63), which reference faces area provided for torque transmission from the cycloid disks (05, 06, 07) to at least output device (08), the at least one output device (08) being operatively connected to one or more reference faces (53, 63) of at least one cycloid disk (05, 06, 07) such that the motions of one or more cycloid disks (05, 06, 07) as they roll in the housing (02) are converted into a rotary motion of the output shaft (04), and beginning at a relative orientation of the reference faces (53, 63) to the outer set of teeth (51, 61, 71) of one cycloid disk (05, 06, 07) of two or more cycloid disks (05, 06, 07) disposed rotationally relative to one another about the cylinder axis (20), the reference faces (53, 63) of the at least one remaining cycloid disk (06, 07, 05) of the cycloid disks (05, 06, 07) disposed rotationally relative to one another about the cylinder axis (20) are disposed rotationally, relative to their outer set of teeth (51, 61, 71), by an offset d of their angular position about their rotary axis (50, 60, 70), which offset d of the relative rotation results from the quotient of the difference between the number of teeth of the inner set of teeth (22) and the outer set of teeth (51, 61, 71) from the number of cycloid disks (05, 06, 07) disposed rotationally in various rotary positions and associated with an output device (08).

5. The cycloid gear of claim 3, characterized by annular parts (25, 26), associated with the individual cycloid disks (05, 06, 07), of the inner set of teeth (22), each annular part (25, 26) being associated with one cycloid disk (05, 06, 07), and the cycloid gear (01) including a number of parts (25, 26) corresponding to the number of cycloid disks (05, 06, 07), and the sets of teeth of the parts (25, 26) associated with the cycloid disks (05, 06, 07) being disposed rotationally relative to one another about the cylinder axis (20), are disposed rotationally relative to one another by an offset d of their angular position about the cylinder axis (20), which offset results from the quotients of the difference between the number of teeth of the inner set of teeth (22) and the outer set of teeth (51, 61, 71) and the number of cycloid disks (05, 06, 07) disposed rotationally in various rotary positions and associated with an output device (08).

6. The cycloid gear of claim 1, characterized in that the inner set of teeth (22) has a number of teeth higher by an even number than the respective outer sets of teeth (51, 61, 71) of the cycloid disks (05, 06, 07).

7. The cycloid gear of claim 1, characterized in that the output device (08) is formed of two revolute bodies (81, 82), connected to one another by means of spacer bodies (80), and the cycloid disks (05, 06, 07) of the cycloid gear (01) are disposed between the revolute bodies (81, 82) of the output device (08).

8. The cycloid gear of claim 1, characterized in that the at least one output device (08) is connected to the output shaft (04), or surrounds it or is surrounded by it.

9. The cycloid gear of claim 1, characterized in that the same number of cycloid disks (05, 06, 07) is disposed rotatably on each eccentric portion (31) of the input shaft (03).

10. The cycloid gear of claim 1, characterized in that the cycloid disks (05, 06, 07) which upon their rolling in the housing (02) execute transverse motions relative to the at least one output device (08) supported rotatably about the cylinder axis (20) each have reference faces (53, 63), which reference faces are provided for torque transmission from the cycloid disks (05, 06, 07) to at least one output device (08), and the at least one output device (08) is operatively connected to one or more reference faces (53, 63) of at least one cycloid disk (05, 06, 07) such that the motions of one or more cycloid disks (05, 06, 07), upon their rolling in the housing (02), are converted into a rotary motion of the output shaft (04), and one or more reference faces (53, 63) include the following, disposed on or in one or both end faces (52, 62) of a cycloid disk (05, 06, 07);

radially extending guideways normal to the rotary axis (50, 60, 70) and/or protrusions and/or grooves and/or eccentrically disposed pins extending parallel to the rotary axis (50, 60, 70), and/or eccentrically disposed bolts extending parallel to the rotary axis (50, 60, 70), and/or eccentric through openings (55, 65) connecting both face ends (52, 62) of a cycloid disk (05, 06, 07) to one another.

11. The cycloid gear of claim 1, characterized in that the cycloid disks (05, 06, 07) which upon their rolling in the housing (02) execute transverse motions relative to the at least one output device (08) supported rotatably about the cylinder axis (20) each have reference faces (53, 63), which reference faces are provided for torque transmission from the cycloid disks (05, 06, 07) to at least one output device (08), and the at least one output device (08) is operatively connected to one or more reference faces (53, 63) of at least one cycloid disk (05, 06, 07) such that the motions of one or more cycloid disks (05, 06, 07), upon their rolling in the housing (02), are converted into a rotary motion of the output shaft (04), and the at least one output device (08) has one or more reference faces corresponding to the reference faces (53, 63) of at least one of the cycloid disks (05, 06, 07), and one or more reference faces of the output device (08) include the following, disposed on or in one or both end faces (52, 62) of a cycloid disk (05, 06, 07):

radially extending guideways normal to the cylinder axis (20) and/or protrusions and/or grooves and/or eccentric through openings and/or eccentrically disposed pins extending parallel to the cylinder axis (20), and/or eccentrically disposed bolts extending parallel to cylinder axis (20).

12. The cycloid gear of claim 11, characterized by roller bearings and/or roller elements (10) disposed between cooperating reference faces (53, 93; 63, 93; 86, 96) of different elements of the cycloid gear (01), at least between the cooperating reference faces of the following:

cycloid disks (05, 06, 07) and output device (08) or cycloid disks (05, 06, 07) and transformation devices (09) as well as transformation devices (09 and output device (08).

13. The cycloid gear of claim 1, characterized in that between the output device (08) and each cycloid disk (05, 06, 07), a respective transformation device (09) is disposed, and the output device (08), like the cycloid disks (05, 06, 07), has one or more reference faces (86), which reference faces are provided for torque transmission from the cycloid disks (05, 06, 07), which upon their rolling in the housing (02) execute transverse motions relative to the at least one output device (08) supported rotatably about the cylinder axis (20), to at least one output device (08) with conversion of the motion of one or more cycloid disks (05, 06, 07) upon their rolling in the housing (02) into a rotary motion of the output shaft (04), and one or more reference faces (86) of the output device (08) include the following, disposed on or in a face extending normally to the cylinder axis (20):

radially extending guideways normal to the cylinder axis (20) and/or protrusions and/or grooves and/or eccentric through openings and/or eccentrically disposed pins extending parallel to the cylinder axis (20), and/or eccentrically disposed bolts extending parallel to cylinder axis (20), and each transformation device (09) has reference faces (93), corresponding to the reference faces (53, 63) of the respective cycloid disk (05, 06, 07), as well as reference faces (96), corresponding to the reference faces (86) of the output device (08), as a result of which corresponding pairs of reference faces (53, 93; 63, 93) result between each cycloid disk (05, 06, 07) and the transformation device (09) associated with it, as well as corresponding pairs of reference faces (86, 96) between the transformation device (09) and the output device (08), which pairs of reference faces (53, 93; 63, 93; 86, 96) permit translational relative motions in directions perpendicular to the cylinder axis (20) between the cycloid disk (05, 06, 07) and output device (08) and execute rotational relative motions about the cylinder axis (20) between the cycloid disk (05, 06, 07) and the output device (08), and the transformation devices (09) execute intermediate motions, which are first back and forth intermediate motions relative to the respective transformation device (09) in a first direction relative to the output device (08) and second back and forth intermediate motions in a second direction, orthogonal to the first direction, relative to the cycloid disk (05, 06, 07), and the two first and second directions, which are perpendicular to one another, are located in a plane extending perpendicular to the cylinder axis (20).

14. The cycloid gear of claim 13, characterized in that reference faces (53, 93; 63, 93) forming pairs between the cycloid disk (05, 06, 07) and the transformation device (09) are embodied identically to the reference faces (86, 96) forming pairs between the transformation device (09) and the output device (08).

15. The cycloid gear of claim 1, characterized in that the cycloid disks (05, 06, 07) are embodied as a gear wheel or as a cam disk and/or—the contact between the housing (02) and a cycloid disk (05, 06, 07) is established by means of fixed teeth (23) and/or by rotatable teeth (23) that are roller bearing (24) and/or ball bearing elements.

16. The cycloid gear of claim 1, characterized in that the inner set of teeth, with a desired number of teeth as the point of departure has a lower actual number of teeth, and the teeth at the actual number of teeth are embodied and positioned identically to how they are embodied and positioned at the desired number of teeth, so that at the actual number of teeth, unlike at the desired number of teeth, there are one or more gaps between adjacent teeth, in which gaps one or more identical teeth of the inner set of teeth can find space.

17. A cycloid gear (01), including:

a housing (02) with a cylindrical inner housing wall (21) including an inner set of teeth (22) disposed concentrically about a cylinder axis (20);

an input shaft (03), supported rotatably about the cylinder axis (20), having at least two eccentric portions (31) of identical eccentricity (32) that are disposed rotationally about a longitudinal axis (30) of the input shaft (03);

an output shaft (04), supported rotatably about the cylinder axis (20), in which the longitudinal axis (30) of the input shaft (03) and a longitudinal axis (40) of output shaft (04) coincide with the cylinder axis (20);

two cycloid disks (05, 06) each including a central rotary axis (50, 60) about which each cycloid disk (05, 06) is rotatable, each cycloid disk (05, 06) includes an outer set of teeth (51, 61), meshing with the inner set of teeth (22), the rotary axis (50, 60) of each cycloid disk (05, 06) is offset by the eccentricity (32) to the cylinder axis (20), and each cycloid disk (05, 06) includes a diameter which is dimensioned such that their outer set of teeth (51, 61) come to mesh with the inner set of teeth (22) in one direction, and in an opposite direction, the outer set of teeth (51, 61) is free of an engagement with the inner set of teeth(22); and an output device (08) which converts the motions of the cycloid disks (05, 06), as they rotate in the housing (02), into a rotary motion of the output shaft (04), wherein the outer sets of teeth (5 1, 61) of the cycloid disks (05, 06) each have an even number of teeth N, and the inner set of teeth (22) of the housing (02) has a number of teeth N+Z or N−Z that is higher or lower than the outer set of teeth (51, 61) such that the outer set of teeth of one of the cycloid discs (05, 06) (22) is rotated relative to the outer set of teeth on the other cycloid disc (05, 06) by a one-half spacing of one of the teeth, that is, by an angle 180°/the even number of teeth within the housing (02)

a difference between the number of the inner set of teeth (22) and the number of the outer set of teeth (51, 61) is equal to 1.

* * * * *